United States Patent [19]

Sorimachi

[11] Patent Number: 4,989,827

[45] Date of Patent: Feb. 5, 1991

[54] DISTANCE DISTRIBUTION MEASURING METHOD AND APPARATUS VARYING SPACING BETWEEN AN IMAGE PICKUP AND THE OPTICAL AXIS

[75] Inventor: Kanehiro Sorimachi, Yokohama, Japan

[73] Assignee: Canon Kabushiki Kaisha, Tokyo, Japan

[21] Appl. No.: 540,309

[22] Filed: Jun. 20, 1990

Related U.S. Application Data

[63] Continuation of Ser. No. 396,759, Aug. 22, 1989, abandoned, which is a continuation of Ser. No. 114,520, Oct. 30, 1987, abandoned.

[30] Foreign Application Priority Data

| Oct. 31, 1986 | [JP] | Japan | 61-258579 |
| Oct. 31, 1986 | [JP] | Japan | 61-258580 |
| Dec. 4, 1986 | [JP] | Japan | 61-287778 |

[51] Int. Cl.⁵ ............................................. G01J 1/20
[52] U.S. Cl. .................................. 250/201.1; 250/204; 356/4
[58] Field of Search ............. 250/201, 204, 201.1, 250/561, 208.1; 356/1, 4; 354/402, 408

[56] References Cited

U.S. PATENT DOCUMENTS

| 4,254,330 | 3/1981 | Stauffer et al. . | |
| 4,298,259 | 11/1981 | Aoki et al. . | |
| 4,469,939 | 9/1984 | Utagawa | 250/204 |
| 4,575,626 | 3/1986 | Oinoue et al. | 250/201 PF |
| 4,589,770 | 5/1986 | Jones et al. . | |
| 4,601,053 | 7/1986 | Grumet . | |
| 4,746,790 | 5/1988 | Sorimachi | 250/201 |
| 4,749,848 | 6/1988 | Sorimachi | 250/204 |
| 4,762,987 | 8/1988 | Ishida et al. | 250/204 |

FOREIGN PATENT DOCUMENTS

| 3147525 | 7/1982 | Fed. Rep. of Germany . |
| 58-88212 | 5/1983 | Japan . |
| 61-112915 | 8/1984 | Japan . |
| 61-88212 | 5/1986 | Japan . |

OTHER PUBLICATIONS

Patent Abstracts of Japan, vol. 10, No. 294 (p–504) (2350), Oct. 7, 1986; & JP-A-61 112 915.

*Primary Examiner*—Edward P. Westin
*Attorney, Agent, or Firm*—Fitzpatrick, Cella, Harper & Scinto

[57] ABSTRACT

A distance distribution measuring method includes the steps of disposing an image pickup on the optic axis of a projection optical system, forming on the image pickup the images of objects existing in multiple directions through the projection optical system, progressively varying the spacing in the direction of the optic axis between the projection optical system and the image pickup, extracting substantially in-focus one of the object images on the image pickup for each amount of spacing along with the step of varying the spacing, and finding the distance to an object corresponding to each object image extracted at the step of extracting, on the basis of the amount of spacing when the object image is extracted, thereby obtaining the distances to the objects existing in the multiple directions and measuring the distance distribution.

16 Claims, 12 Drawing Sheets

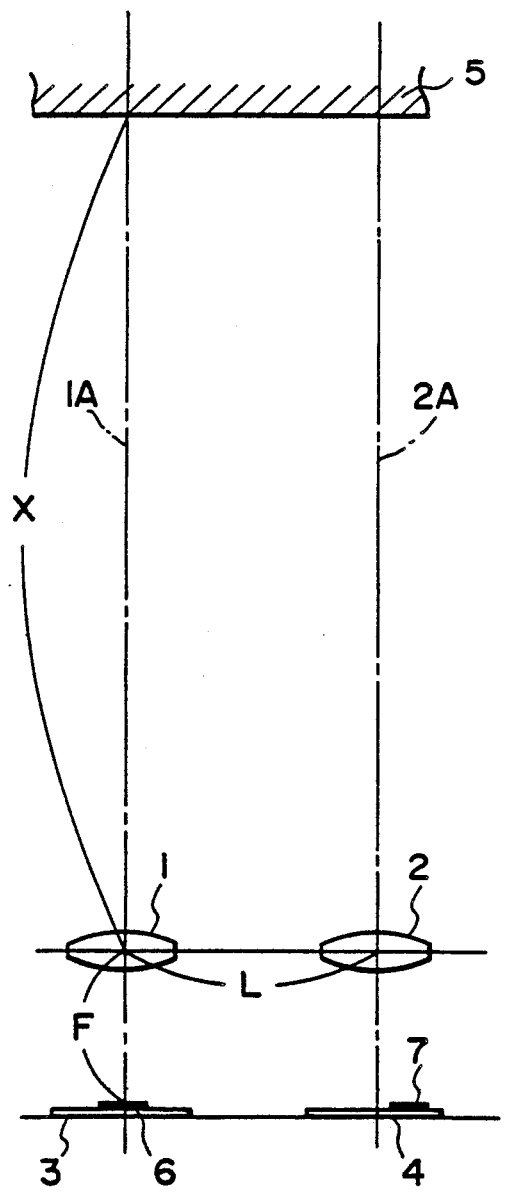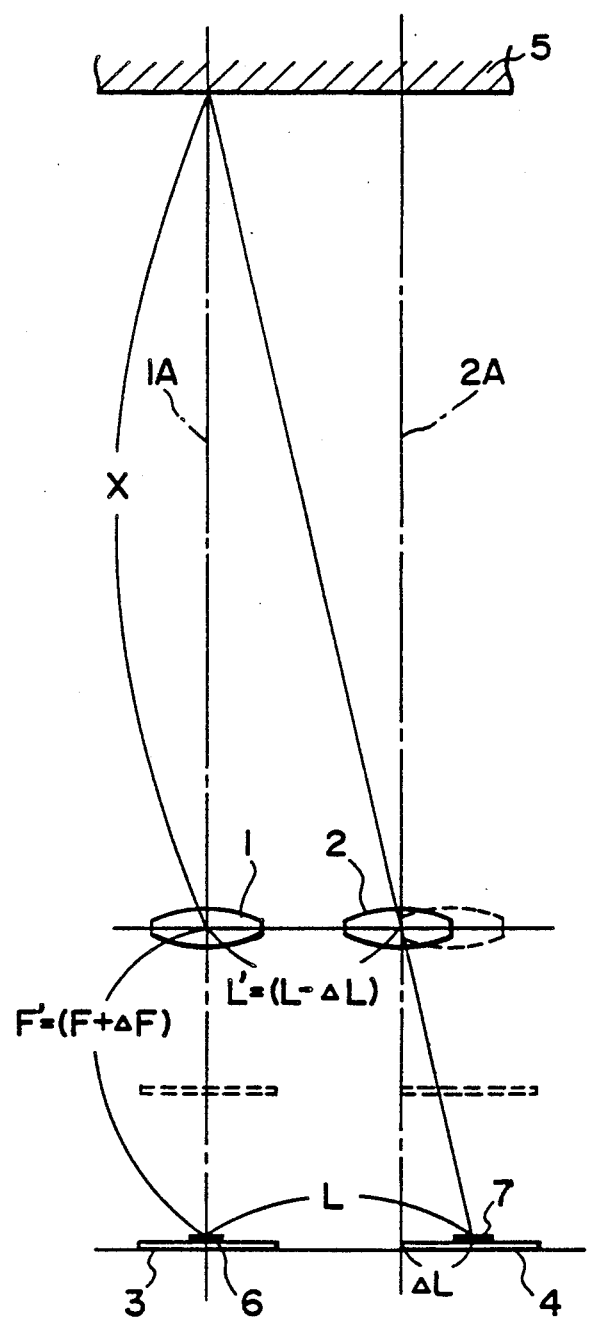

FIG. 6
(a) 
(b) 
(c) 
(d) 
(e) 
(f) 
(g) 
(h) 

DISTANCE DISTRIBUTION MEASURING METHOD AND APPARATUS VARYING SPACING BETWEEN AN IMAGE PICKUP AND THE OPTICAL AXIS

This application is a continuation of application Ser. No. 396,759, filed Aug. 22, 1989, which is a continuation of application Ser. No. 114,520 filed Oct. 30, 1987, both now abandoned.

BACKGROUND OF THE INVENTION

1. Field of the Invention

This invention relates to a distance distribution measuring method, and in particular to a method of optically measuring the distribution of distances to objects in an ambient environment. Such a distance distribution measuring method is effectively utilized, for example, as visual means for the recognition of the environment of an automatically moving robot.

2. Related Background Art

As a method of optically measuring the distance to an object, there is a method called the stereo method. In this method, two objective lenses of the same focal length are maintained with their optic axes kept parallel to each other and juxtaposed with a predetermined distance therebetween. Illumination distribution measuring means is disposed rearwardly of each objective lens, whereby the distance to the object can be calculated from the positional relation between the identical illumination distribution patterns measured by the two measuring means.

FIGS. 1A and 1B of the accompanying drawings illustrate the principle of the stereo method. In these figures, the referece numerals 101 and 102 designate light-converging objective lenses equal in focal length, and the reference characters 101A and 102A denote the optic axes of these objective lenses, respectively. The lenses 101 and 102 are disposed so that their optic axes 101A and 102A are parallel to each other, and a straight line pass through the centers of the lenses (the base line) orthogonal to the optic axes 101A and 102A. Measuring means 103 is disposed rearwardly of the lens 101 at a location spaced from the lens by an amount corresponding to the focal length F of this lens, and measuring means 104 is disposed rearwardly of the lens 102 at a location spaced from the lens by an amount corresponding to the focal length F. These measuring means are disposed on a straight line extending in a direction parallel to the direction of the base line of the lenses 101 and 102.

In FIG. 1A, an object 105 exists at infinity in the direction of the optic axis 101A. In this case, the image 106 of the object 105 formed on the measuring means 103 by the lens 101 exist on the optic axis 101A and likewise, the image 107 of the object 105 formed on the measuring means 104 by the lens 102 exists on the optic axis 102A.

In FIG. 1B, the object 105 exists at a location on the optic axis 101A which is spaced from the lens by a finite distance X. In this case, the image 106 of the object 105 formed on the measuring means 103 by the lens 101 exists on the optic axis 101A, while the image 107 of the object 105 formed on the measuring means 104 by the lens 102 exists at a location spaced apart by a distance D from the optic axis 102A.

Accordingly, by detecting the amount of deviation D of the image 107 from the optic axis 102A by the measuring means, the distance X to be measured can be found from the distance F between the lenses 101, 102 and the measuring means 103, 104 and the length L of the base line by a calculating process using the following equation:

$$X = FL/D.$$

Now, images are generally formed on and throughout the measuring means and it is difficult to specify the image of the same object point on the same object. So, in the stereo method as described above, the correlation between the illumination distribution on one measuring means 103 and the illumination distribution on the other measuring means 104 is taken to find the positions of the images 106 and 107 by the measuring means 103 and 104.

The applicant has already disclosed several techniques of measuring the distance distribution to various objects existing in multiple directions by carrying out such correlation processing of the illumination distributions or by other techniques in U.S. application Ser. Nos. 706,727, No. 796,313, No. 827,016 and No. 938,562.

FIGS. 2A, 2B and 2C of the accompanying drawings illustrate the principle of the above-described correlation method.

As the measuring means 103 and 104, use is made, for example, of CCD arrays which are self-scanning type sensors.

In FIG. 2A, a CCD array 103 which is the measuring means corresponding to the lens 101 has n light-receiving elements, and a CCD array 104 which is the measuring means corresponding to the lens 102 has m light-receiving elements (m>n). That is, if the distance to the object on the optic axis 101A is to be measured, the image 106 by the lens 101 exists on the optic axis 101A independently of the distance to the object, while the image 107 by the lens 102 changes its position in conformity with the distance to the object and therefore, more light-receiving elements are provided on the CCD array 104 than on the CCD array 103. In such an arrangement, the CCD array 103 is referred to the standard view field and the CCD array 104 is referred to as the reference view field.

The illumination distributions in the standard view field and the reference view field as shown in FIG. 2A are such as shown in FIG. 2B. That is, the imaging relation in the direction of the optic axis between the object 105 and the image 106 with respect to the lens 101 is equal to the imaging relation in the direction of the optic axis between the object 105 and the image 107 with respect to the lens 102 (that is, the magnifications are equal) and therefore, the illumination distribution of the image 106 and the illumination distribution of the image 107 differ from each other only in that they deviate from the optic axis by a distance D.

Accordingly, the outputs corresponding to the respective light-receiving elements as shown in FIG. 2C are obtained from the CCD arrays 103 and 104.

So, to take the correlation between the outputs of the two CCD arrays, the sum of the differences between the corresponding ones of the outputs S(1)S(n) of the first to nth light-receiving elements in the standard view field and the outputs R(1) - R(n) of the first to nth light receiving elements in the reference view field, $$COR(1) = \sum_{k=1}^{n} [S(k) - R(k)],$$

is first found. Subsequently, in the same manner, the sum of the differences between the corresponding ones of the outputs S(1) - S(n) of the first to nth light-receiving elements in the standard view field and the outputs R(2) - R(n+1) of the second to (n+1)th light-receiving elements in the reference view field, $$COR(2) = \sum_{k=1}^{n} [S(k) - R(k + 1)],$$

is found. Thereafter, in the same manner, up to $$COR(m - n + 1) = \sum_{k=1}^{n} [S(k) - R(k + m - n)]$$

are found.

The number of COR which is the smallest one (ideally 0) of the (m-n+1) values found in this manner is chosen and that number is multiplied by the width of a light-receiving element of the CCD array, whereby the value of said D can be found.

Now, in the correlation method as described above, where the object images on the CCD arrays 103 and 104 are, for example, repetitive pattern images or the like, it is sometimes judged that when the correlation is taken, there is correspondence even at a wrong position, and this leads to the problem that the accuracy of measurement is not yet sufficient. Also, where a distance measurement is effected with respect to each direction to find the distance distribution to the objects in the field of view, there arises the problem that the number of correlation calculations becomes very great and the processing circuit of the measuring apparatus becomes complicated. Further, there is also the problem that in the correlation method, the resolutions of direction cannot be sufficiently enhanced.

SUMMARY OF THE INVENTION

It is an object of the present invention to provide, in view of the above-noted problems peculiar to the prior art, a distance distribution measuring method which can accomplish measurement of distance distribution highly accurately.

To achieve the above object, the distance distribution measuring method of the present invention is characterized by disposing two optical systems having substantially the same focal length so that their optic axes are parallel to each other, disposing illumination distribution measuring means rearwardly of said optical systems at the same distance therefrom perpendicularly to the optic axes thereof, measuring the illumination distribution by each of said illumination distribution measuring means while varying the spacing at least between said optical systems and said illumination distribution measuring means, differentiating said two illumination distributions with respect to the respective positions thereof and extracting corresponding ones of said two differentiated signals whose absolute value exceeds a predetermined value, and calculating the distances to objects corresponding to the positions of said corresponding signals from (1) the positions of said corresponding signals, (2) the focal length of said optical systems, and (3) the then positional relation between said two optical systems and said two illumination distribution measuring means.

One form of the distance distribution measuring method of the present invention is characterized by disposing two optical systems having substantially the same focal length so that their optic axes are parallel to each other, disposing illumination distribution measuring means rearwardly of said optical systems at the same distance therefrom perpendicularly to the optic axes thereof, measuring the illumination distribution by each of said illumination distribution measuring means while varying (1) the spacing between said optical systems and said illumination distribution measuring means and (2) the spacing between said two illumination distribution measuring means or the spacing between the optic axes of said two optical systems while maintaining the ratio of the distance between said optical systems and said illumination distribution measuring means to the distance between said two illumination distribution measuring means substantially constant, differentiating said two illumination distributions with respect to the respective positions thereof, extracting corresponding ones of said two differentiated signals whose absolute value exceeds a predetermined value, and calculating the distances to objects with respect to the positions of said corresponding signals from the positions of said corresponding signals, the focal length of said optical systems and the then positional relation between said two optical systems and said two illumination distribution measuring means.

BRIEF DESCRIPTION OF THE DRAWINGS

FIGS. 5A and 5B illustrate the optical systems when measurement is effected by the use of the apparatus shown in FIGS. 3, 4A and 4B.

FIGS. 6-8 illustrate the process of signal processing when measurement is effected by the use of the apparatus shown in FIGS. 3, 4A and 4B.

DESCRIPTION OF THE PREFERRED EMBODIMENTS

Figure 1A:
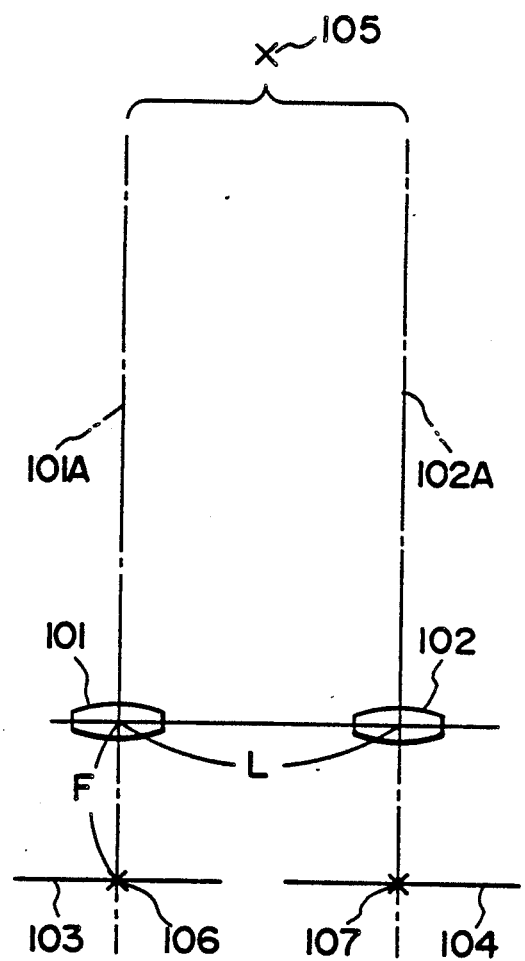
FIGS. 1A and 1B illustrate a distance measuring method using the stereo method.
Figure 1B:
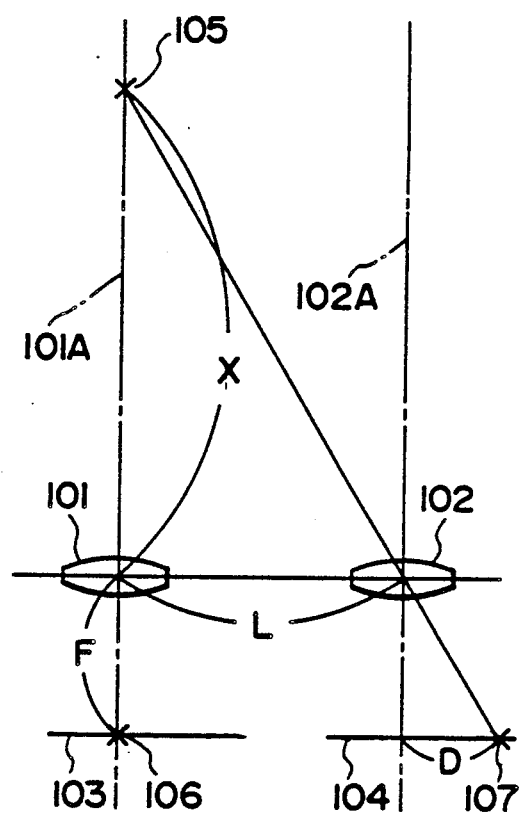
Figure 2A:
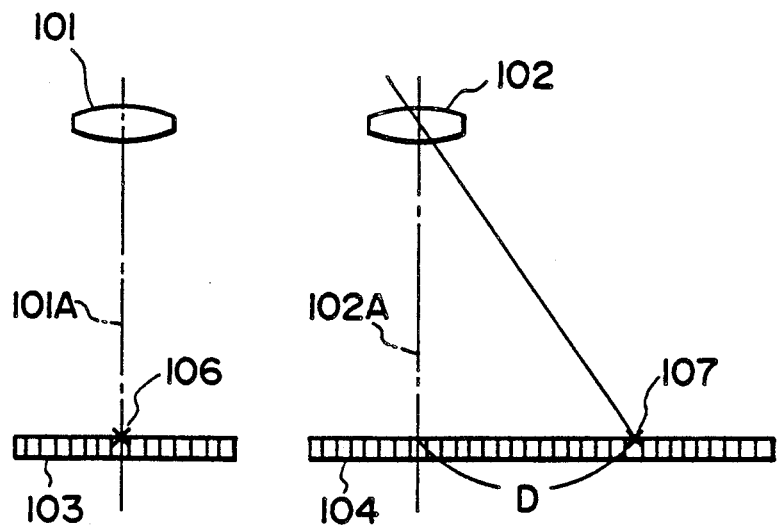
FIGS. 2A-2C illustrate the principle of correlation when an illumination distribution correlation method is used in the stereo method.
Figure 2B:
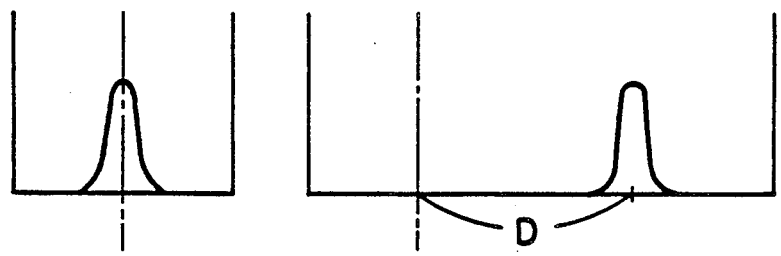
Figure 2C:
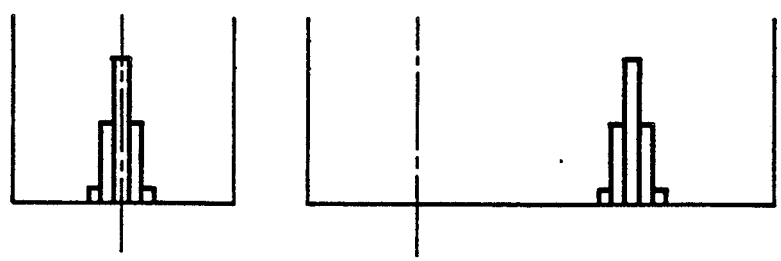
Figure 3:
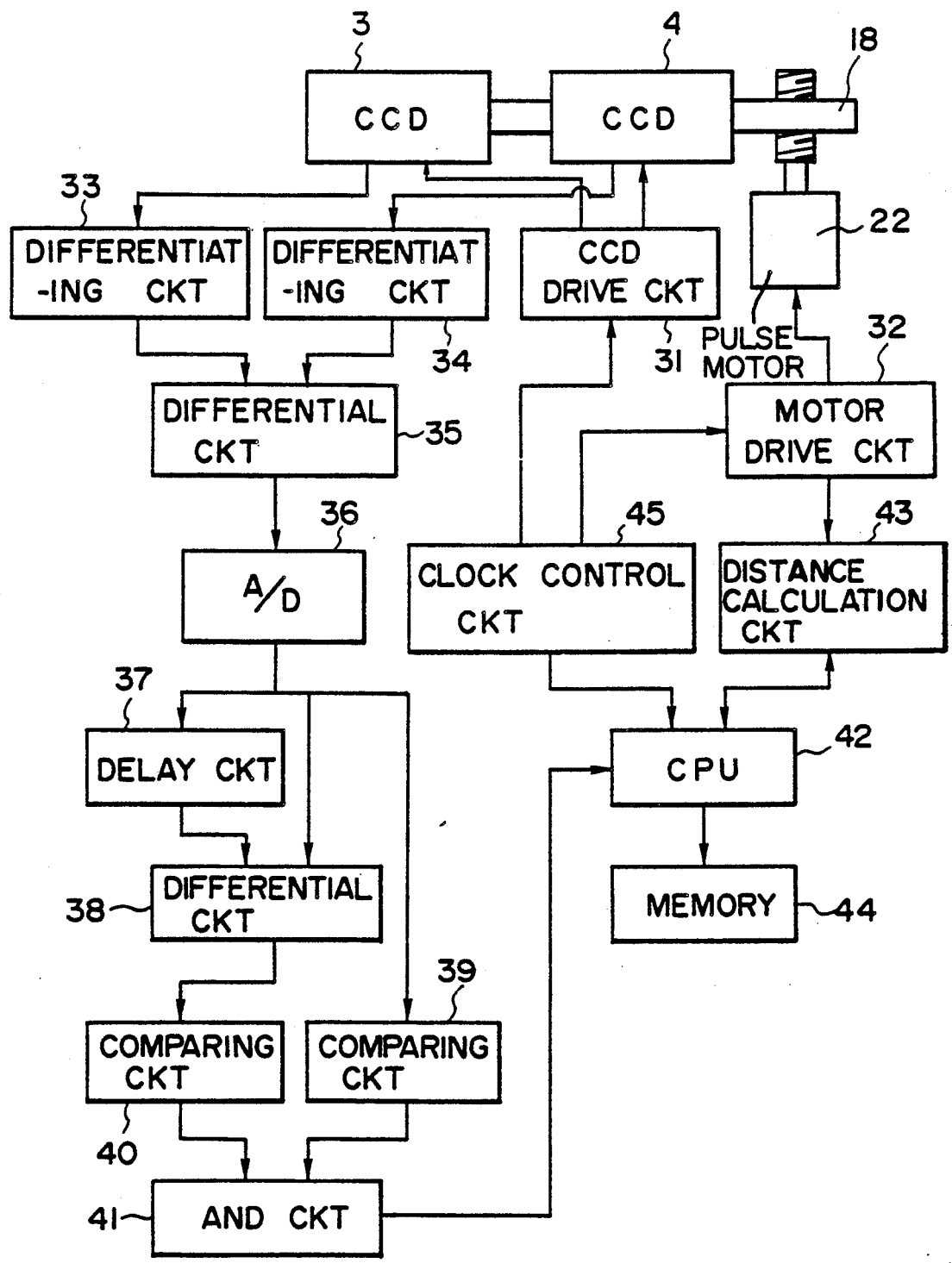
FIG. 3 is a schematic block diagram showing an embodiment of an apparatus for carrying out the distance distribution measuring method of the present invention.
Figure 4A:
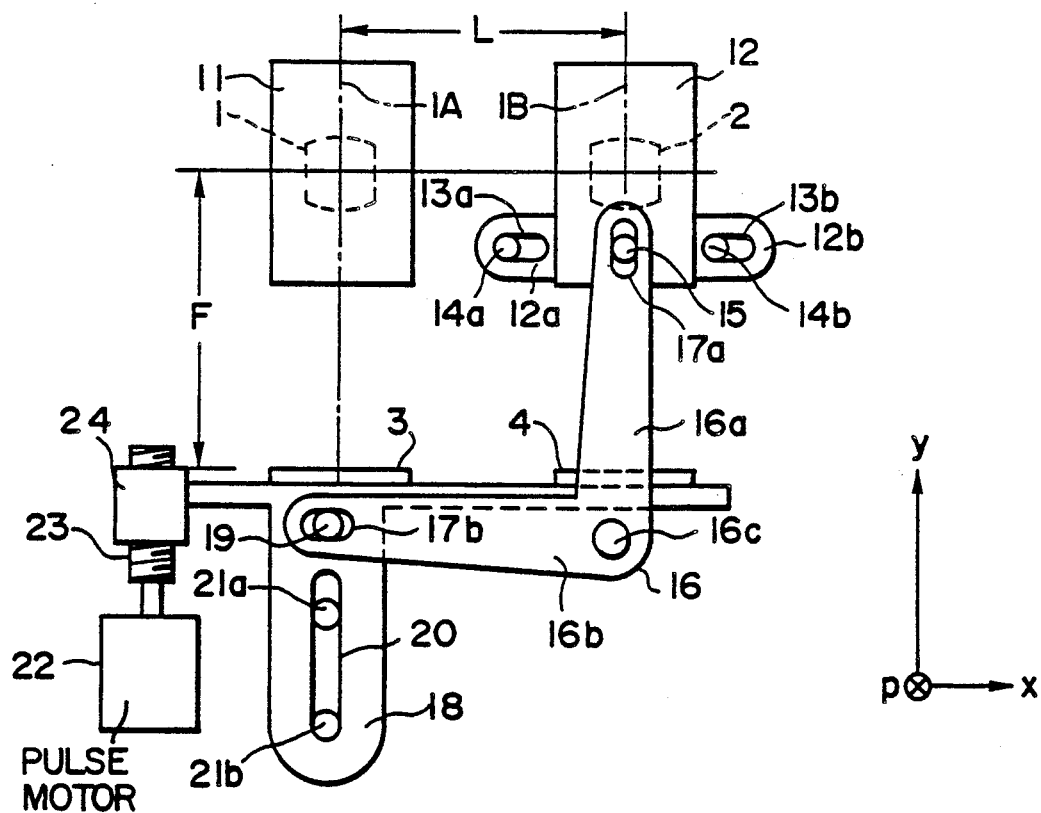
FIGS. 4A and 4B are partial schematic views of the apparatus shown in FIG. 3.
Figure 4B:
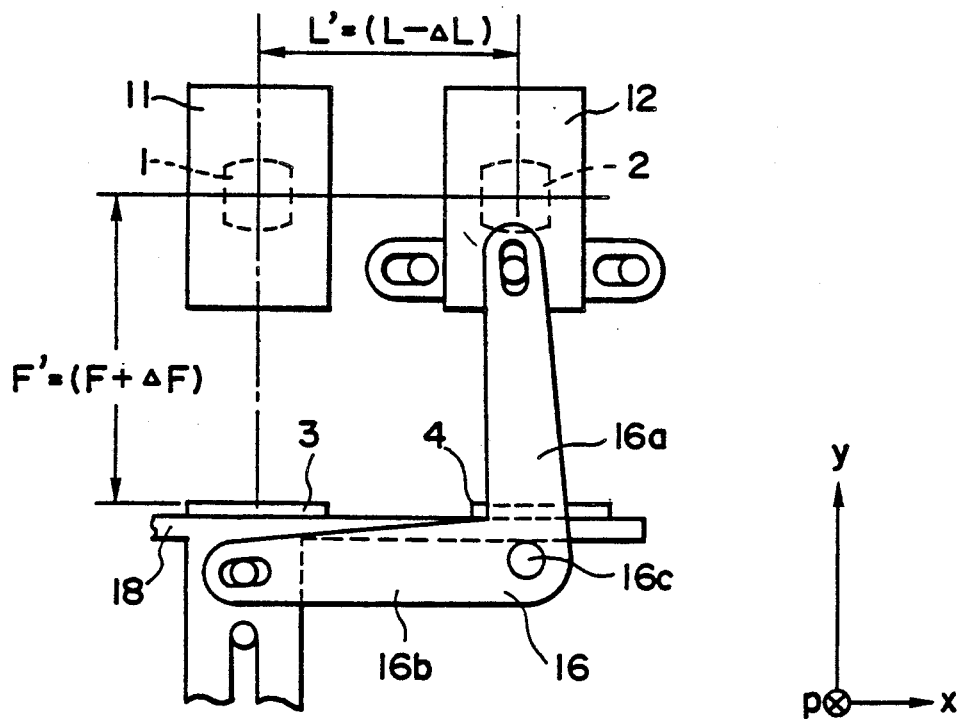

FIG. 3 is a block diagram showing the construction of an embodiment of an apparatus for carrying out a distance distribution measuring method in accordance with the present invention, and FIGS. 4A and 4B are schematic views of portions of the apparatus.

Referring to FIGS. 4A and 4B, the reference numeral 11 designates the barrel of a lens 1. The barrel 11 is fixed to a frame, not shown. Denoted by 1A is the optic axis of the lens 1. The reference numeral 12 designates the barrel of a lens 2. The barrel 12 has attached thereto a pair of accessory members 12a and 12b extending in the direction of the base line. The accessory members 12a and 12b are formed with guide slots 13a and 13b extending in the direction of the base line. The reference characters 14a and 14b denote guide pins fixed to the frame, not shown. These guide pins are fitted in the guide slots 13a and 13b, respectively. The barrel 12 has attached thereto a guide pin 15 protruding in a direction (hereinafter referred to the direction P) orthogonal to both of the direction of the optic axis (the y direction) and the direction of the base line (the x direction). The focal lengths of the lenses 1 and 2 both are F.

The reference numeral 16 designates a crank lever having two arms 16a and 16b substantially orthogonal to each other. The arm 16a extends substantially in the direction of the optic axis and the arm 16b extends substantially in the direction of the base line. A pivot shaft 16c extending in the direction P is provided on the connection between the two arms 16a and 16b. The rotary shaft 16c is rotatably connected to the frame, not shown. A guide slot 17a extending in the direction toward the center of the pivot shaft 16c is formed in the end portion of the arm 16a, and a guide slot 17b extending in the direction toward the center of the rotary shaft 16c is formed in the end portion of the arm 16b. The guide pin 15 attached to the barrel 12 is fitted in the guide slot 17a.

The reference numerals 3 and 4 designate CCD arrays disposed correspondingly to the lenses 1 and 2, respectively, and having the same number of light-receiving elements. The CCD arrays 3 and 4 are fixed on a support member 18 at a predetermined interval along the direction of the base line. The support member 18 has attached thereto a guide pin 19 protruding in the direction P. The guide pin 19 is fitted in the guide slot 17b. Also, the support member 18 is formed with a guide slot 20 extending in the direction of the optic axis. The reference characters 21a and 21b denote guide pins aligned along the direction of the optic axis and fixed to the frame, not shown. The guide pins 21a and 21b are fitted in the guide slot 20.

The support member 18 has connected thereto driving means for reciprocally moving the support member 18 in the direction of the optic axis. The driving means comprises a pulse motor 22, an externally threaded member 23 attached to the driving rotary shaft of the motor 22, and an internally threaded member 24 attached to the support member so as to mesh with the externally threaded member 23. The internally threaded member 24 and the support member 18 are connected together.

In FIG. 4A, the center of the lens 1 and the center of the lens 2 lie with a distance L therebetween in the direction of the base line, and likewise, the center of the CCD array 3 and the center of the CCD array 4 lie with a distance L therebetween in the direction of the base line, and the lenses 1, 2 and the CCD arrays 3, 4 are positioned with a distance therebetween corresponding to the focal length F of the lenses 1, 2.

FIG. 4B shows a state in which from the state of FIG. 4A, the crank lever 16 has been rotated through an angle $\theta$ counter-clockwise about the pivot shaft 16c by driving the pulse motor 22. By this rotation of the crank lever 16, the barrel 12 is moved leftwardly by a distance $\Delta L$ in the direction of the base line as viewed in FIG. 4B on the basis of the coupled relation between the guide slot 17a and the guide pin 15 and the coupled relation between the guide slots 13a, 13b and the guide pins 14a, 14b. On the other hand, by this rotation, the support member 18 is moved downwardly by a distance $\Delta F$ in the direction of the optic axis as viewed in FIG. 4B on the basis of the coupled relation between the guide slot 17b and the guide pin 19 and the coupled relation between the guide slot 20 and the guide pins 21a, 21b. In FIG. 4B, the distance between the lens 1 and the lens 2 is (L, and the distance between the lenses 1, 2 and the CCD arrays 3, 4 is $F' = (F + \Delta F)$.

Here, when the arm 16a of the crank lever 16 is parallel to direction of the optic axis as shown in FIG. 4A, the distance from the center of the pivot shaft 16c of the crank lever 16 to the center of the guide pin 15 attached to the barrel 12 is A.L, and the distance from the center of the pivot shaft 16c to the center of the guide pin 19 attached to the support member 18 is A.F (where A is a proportion constant).

In this case, if said rotation angle $\theta$ (radian) is small, the following approximation can be obtained:

$$\Delta L = A.L.\theta$$

$$\Delta F = A.F.\theta$$

and accordingly, $$L'.F' = (L - A.L.\theta).(F + A.F.\theta) = L.F - A^2 L F \theta^2.$$

If $\theta$ is small, $A^2 L F \theta^2$ can be neglected and therefore, the following approximation can be obtained:

$$L'.F' = L.F.$$

In FIG. 3, the CCD arrays 3 and 4 each comprising a plurality of light-receiving elements are driven for reading out at a time by a drive circuit 31, and the pulse motor 22 is driven by a drive circuit 32.

Picture element signals from successive light-receiving elements are time-serially output from the CCD arrays 3 and 4, and the time-serial signals are input as image information signals (so-called video signals) to differentiating circuits 33 and 34. In the differentiating circuits 33 and 34, there are obtained the differentiated signals of said image information signals. The differentiated signals mean, with respect to each picture element signal which is time-serially input, the time-serial signal increment for the picture element signal preceding said picture element signal, and can be obtained by latching the image information signal by an amount corresponding to one picture element, and subtracting the signal of this one picture element from a picture element signal which is subsequently input. This operation is successively executed for a plurality of picture element which are the subject.

The outputs of the differentiating circuits 33 and 34 are input to a differential circuit 35, in which the difference signal of the two differentiated signals is obtained.

The output of the differential circuit 35 is input to an A/D converter 36, in which said difference signal is digitalized.

The output of the A/D converter 36 is input to a delay circuit 37, a differential circuit 38 and a comparing circuit 39.

In the delay circuit 37, utilization is made of means for holding the image information signal of one picture plane such as BBD and delaying it in time. Accordingly, a signal which is the output of the A/D converter and the output of the A/D converter preceding by one picture plane are input to the differential circuit 38 at a time. In the differential circuit 38, there are obtained the difference signal of these two signals.

The output of the differential circuit 38 is input to a comparing circuit 40. The comparing circuit 40 compares the absolute value of the input signal with a predetermined first threshold value, and outputs a signal only when the absolute value of the input signal is greater than said threshold value.

On the other hand, the comparing circuit 39 compares the absolute value of the input signal from the A/D converter 36 with a predetermined second threshold value, and outputs a signal only when the absolute value of the input signal is smaller than the second threshold value.

The output of the comparing circuit 39 and the output of the comparing circuit 40 are input to an AND circuit 41, in which there is obtained the AND signal of the two input signals.

The output of the AND circuit 41 is input to CPU 42.

On the other hand, a signal indicative of the rotation angle of the motor 22 (which rotation angle corresponds to the position of the CCD arrays 3 and 4 in the direction of the optic axis) is output from the motor drive circuit 32 and is input to a distance calculation circuit 43.

The distance calculation circuit 43 effects distance calculation. The result of the calculation is stored in a memory 44 via CPU 42.

The reference numeral 45 designates a clock control circuit for controlling the clock of the operation of each block.

The operation of the apparatus of the present embodiment, that is, an embodiment of the method of the present invention, will hereinafter be described with reference to FIGS. 3, 4A, 4B, 5A, 5B and so forth.

FIGS. 5A and 5B are schematic views of an optical system for explaining the details of the measurement of the present embodiment.

It is to be understood that an object 5 lies at a finite distance X along the optic axes 1A and 1B and has a predetermined length in the direction of the base line.

First, let it be assumed that as shown in FIG. 5A, the distance between the lenses 1 and 2 is L which is identical to the distance between the CCD arrays and the distance between the lenses 1, 2 and the CCD arrays 3, 4 is the focal length F of the lenses. This corresponds to the aforedescribed state of FIG. 4A.

In this state, the image on the CCD array 3 produced by the lens 1 is such as shown in FIG. 6(a), wherein the image of the object 5 is formed centrally in a blurred state. On the other hand, the image on the CCD array 4 formed by the lens 2 is such as shown in FIG. 6(b), wherein the image of the object 5 is formed at a position rightwardly deviated from the center in a blurred state. The image on the CCD array 4 is such an image that the image on the CCD array 3 has been moved rightwardly by a predetermined distance. The signals shown in FIGS. 6(a) and (b) correspond to the image information signals output from the CCD arrays 3 and 4, respectively.

Accordingly, the differentiated signals which are the outputs of the differentiating circuits shown in FIG. 3 are such as shown in FIGS. 6(c) and (d), respectively. The image information signals are gentle signals because of the blur of the images on the CCD arrays and therefore, the absolute values of the differentiated signals are small.

In the differential circuit 35, there is formed a signal train indicative of the difference between the corresponding picture element signals in the outputs of the differentiating circuits 33 and 34, and this difference signal is such as shown in FIG. 6(e). This output signal is small in absolute value on the basis of the fact that the absolute values of the above-mentioned differentiated signals are small.

The output signal from the differential circuit 35 is digitalized by the A/D converter 36, and the subsequent signal processing is digitally effected.

A signal indicative of the difference between the output signal of the A/D converter 36 and the output signal of the delay circuit 37 is output from the differential circuit 38. In the initial state, there is no output of the signal preceding by one picture plane from the delay circuit 37 and therefore, in the differential circuit 38, subtraction is effected with the input signal from the A/D converter used as the dummy of the input signal from the delay circuit and thus, the output signal from the differential circuit 38 generally becomes a 0 signal.

Accordingly, the input signal to the comparing circuit 40 is generally smaller in absolute value than threshould value set in this comparing circuit and therefore, the output signal of this comparing circuit is generally 0 as shown in FIG. 6(f).

On the other hand, the input signal to the comparing circuit 39 is generally smaller in absolute value than the threshold value set in this comparing circuit and therefore, the output signal of this comparing circuit is generally 1 as shown in FIG. 6(g).

Accordingly, the output of the AND circuit 41 is generally 0 as shown in FIG. 6(h).

The output of this AND circuit 41 is input to CPU 42, and since 1 is not included in this signal, a distance calculation command is not provided from CPU 42 to the distance calculation circuit 43 at this point of time.

However, a motor rotation angle signal is output from the motor drive circuit 32 to the distance calculation circuit 43.

Subsequently, the pulse motor 22 is rotated through a suitable angle by the motor drive circuit 32 to thereby move the support member 18 by a predetermined distance in the direction of the optic axis and thus, the barrel 12 of FIGS. 4A and 4B is moved by a predetermined distance in the direction of the base line.

The new picture plane formed in this state is subjected to signal processing in the same manner as described above. In this state, the images on the CCD arrays 3 and 4 assume a pattern substantially similar to that in the above-described case and are a little approximate to the in-focus state. However, the image on the CCD array 4 is such that the image of the object 5 is a little closer to the center than in the above-described case.

Again in the signal processing in this state, there is obtained a signal slightly differing from or identical to that described above.

Thereafter, the driving of the motor 22 and the signal processing are repeated in a similar manner.

FIG. 5B shows a state in which the distance between the lenses 1 and 2 is L' and the distance between the lenses 1, 2 and the CCD arrays 3, 4 is F'. This state is realized by repeating the driving of the motor 22. This corresponds to the state of FIG. 4B.

In the present embodiment, during the rotation of the crank lever 16, ΔL and ΔF vary with the relation that L'. F'=L . F being maintained as described above and thus, the images 6 and 7 of the object 5 are positioned in the in-focus state centrally of the CCD arrays 3 and 4.

That is, as described above, L' . F'=L . F in FIGS. 5A and 5B and therefore, $$L.F = (L - \Delta L)(F + \Delta F)$$

is established. Also, from the similar relation in FIG. 5B, $$(L - \Delta L)/X = L/[X + (F + \Delta F)]$$

is established. From these equations, $$1/F = 1/X + 1/(F + \Delta F)$$

is derived. From this, it is seen that the images 6 and 7 of the object 5 in FIG. 5B satisfy the formula of in-focus imaging with respect to the lenses 1 and 2, respectively.

In the state immediately before this in-focus state is reached (one picture plane before), the image on the CCD array 3 by the lens 1 is such as shown in FIG. 7(a), wherein the image of the object 5 is almost approximate to the in-focus state and formed centrally in a slightly blurred state. On the other hand, the image on the CCD array 4 by the lens 2 is such as shown in FIG. 7(b), wherein the image of the object 5 is approximate to the in-focus state and formed in a slightly blurred state at a position slightly deviated rightwardly from the center. The image on the CCD array 4 is such an image that the image on the CCD array 3 has been moved rightwardly by a slight distance. FIGS. 7(a) and (b) correspond to the image information signals output from the CCD arrays and 4, respectively.

Accordingly, the differentiated signals which are the outputs of the differentiating circuits 33 and 34 are such as shown in FIGS. 7(c) and (d), respectively. The image information signals are signals in which the inclination of the edge portion is considerably steep on the basis of the fact that the images on the CCD arrays are almost in the in-focus state and therefore, in the differentiated signals, there appears a portion of relatively great absolute value in said edge portion.

On the other hand, the input signal to the comparing circuit 39 has a portion of greater absolute value than the threshold value set in this comparing circuit and therefore, the output signal of this comparing circuit becomes partly 1 as shown in FIG. 7(g).

Accordingly, the output of the AND circuit 41 is generally 0 as shown in FIG. 7(h).

This output of the AND circuit 41 is input to CPU 42, and since 1 is not included in this signal, a distance calculation command is not provided from the CPU to the distance calculation circuit 43 at this point of time.

Accordingly, the difference signal which is the output of the differential circuit 35 is such as shown in FIG. 7(e). In FIG. 7(e), the dotted line indicates the difference signal preceding by one picture plane, i.e., the output of the delay circuit 37.

Figure 7:
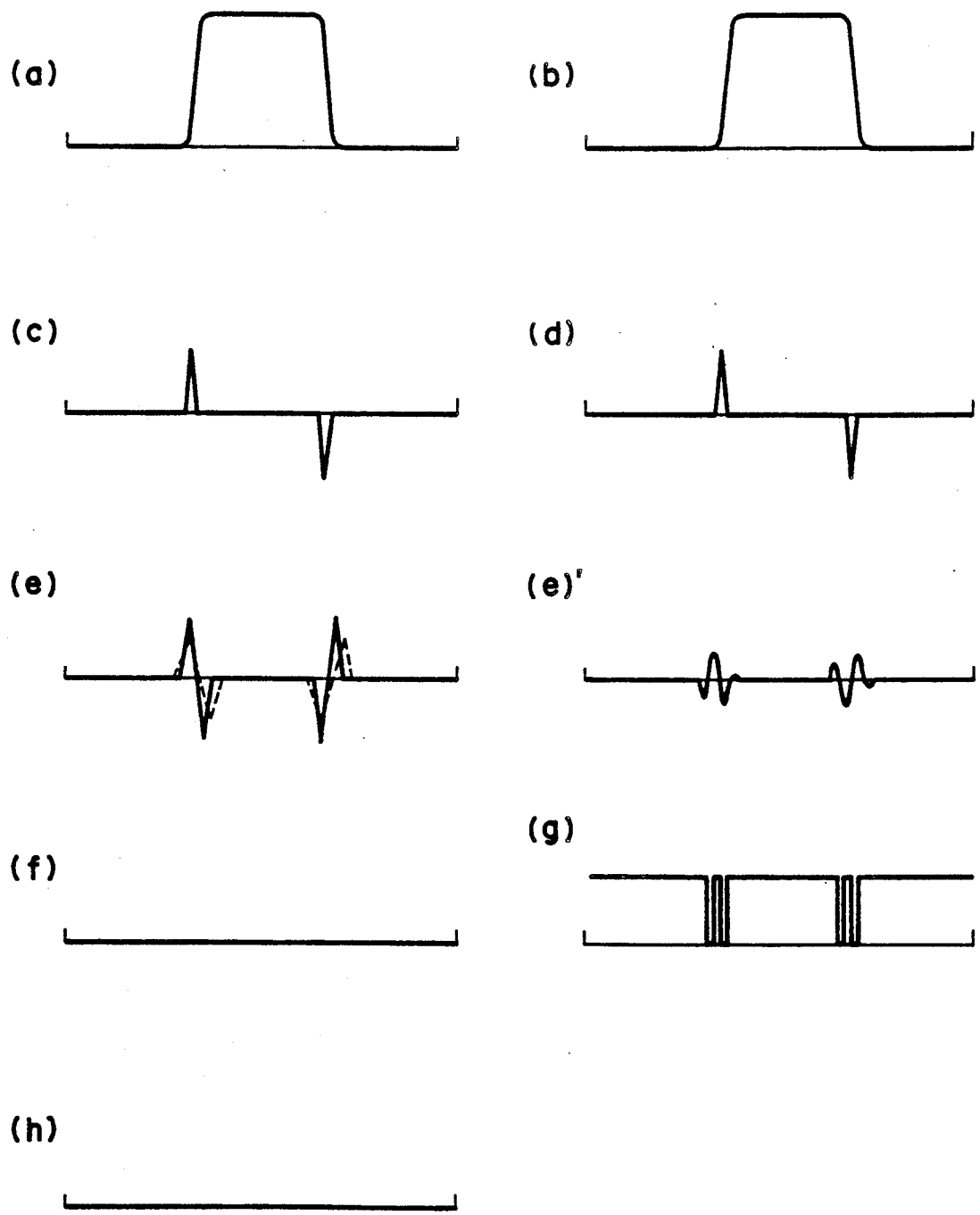

Along with this, the output signal of the differential circuit 38 becomes such as shown in FIG. 7(e').

Accordingly, the input signal to the comparing circuit 40 is still smaller in absolute value than the threshold value set in this comparing circuit and therefore, the output signal of this comparing circuit is generally 0 as shown in FIG. 7(f).

Subsequently, the motor 22 is driven, whereby the in-focus state shown in FIG. 5B is brought about, but in this in-focus state, the image on the CCD array 3 by the lens 1 is such as shown in FIG. 8(a), wherein the image of the object 5 is formed centrally in a sufficient in-focus state. On the other hand, the image on the CCD array 4 by the lens 2 is such as shown in FIG. 8(b), wherein the image of the object is formed centrally in a sufficient in-focus state. The image on the CCD array 4 is an image equal to the image on the CCD array 3. FIGS. 8(a) and (b) correspond to the image information signals output from the CCD arrays 3 and 4, respectively.

Accordingly, the differentiated signals which are the outputs of the differentiating circuits 33 and 34 are such as shown in FIGS. 8(c) and (d), respectively. The image information signals are signals in which the inclination of the edge portion E is very steep on the basis of the fact that the images on the CCD arrays are in a sufficient in-focus state and therefore, in the differentiated signals, there appears a portion of sufficiently great absolute value in said edge portion E.

As described above, the images on the CCD arrays 3 and 4 are identical and the outputs from the CCD arrays 3 and 4 are identical, whereby the differentiated signals which are the outputs of the differentiating circuits 33 and 34 are also identical and therefore, the difference signal which is the output of the differential circuit 35 is generally 0 as shown in FIG. 8(e). In FIG. 8(e), the dotted line indicates the difference signal preceding by one picture plane, i.e., the output of the delay circuit 37.

Figure 8:
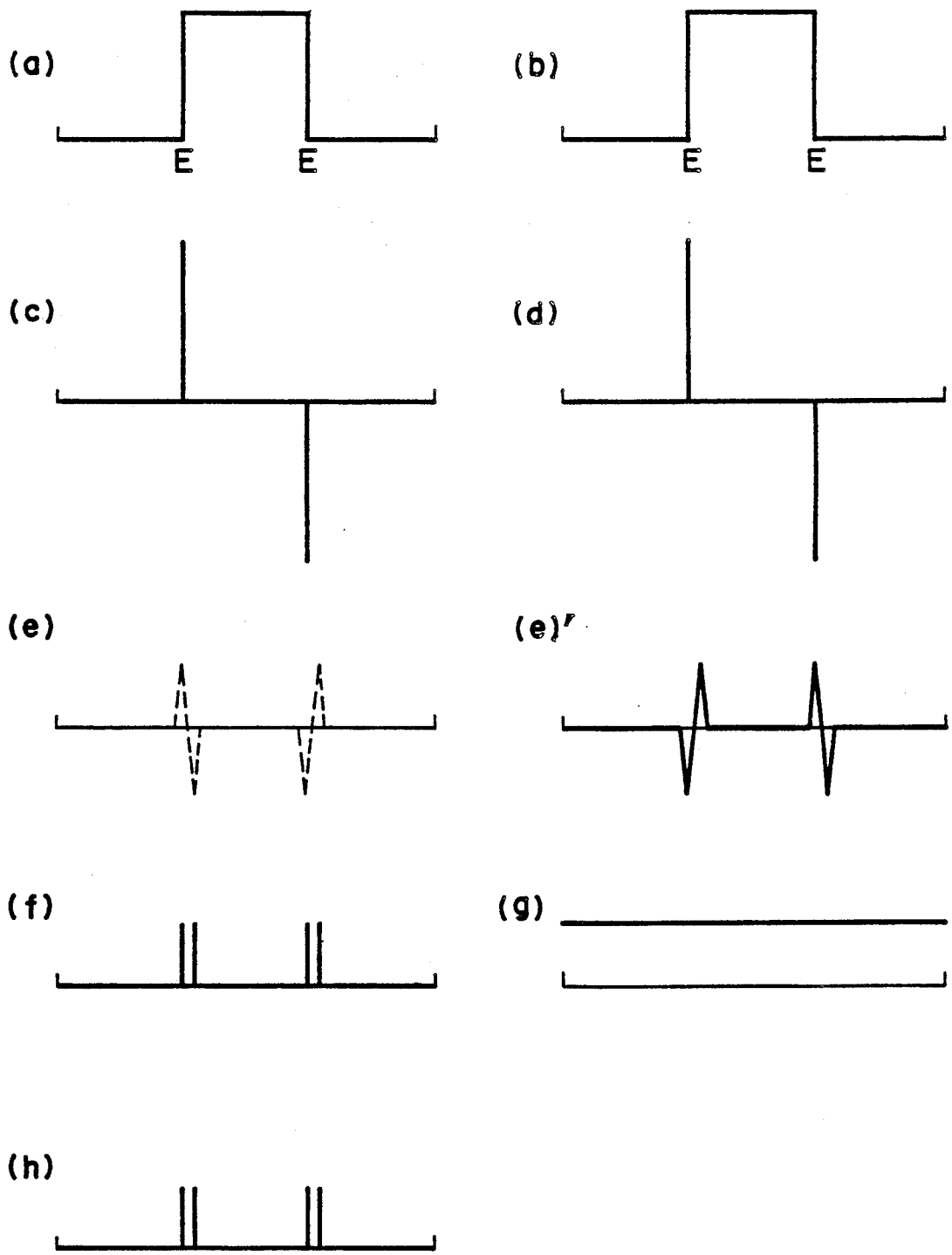

Along with this, the output signal of the differential circuit 38 becomes such as shown in FIG. 8(e').

Accordingly, the input signal to the comparing circuit 40 includes a portion of greater absolute value than the threshold value set in this comparing circuit and therefore, the output signal of this comparing circuit is partly 1 as shown in FIG. 8(f).

On the other hand, the input signal to the comparing circuit 39 is generally smaller in absolute value than the threshold value set in this comparing circuit and therefore, the output signal of this comparing circuit is generally 1 as shown in FIG. 8(g).

Accordingly, the output of the AND circuit 41 is partly 1 as shown in FIG. 8(h).

This output of the AND circuit 41 is input to CPU 42 and 1 is included in this signal and therefore, at this point of time, a distance calculation command is provided from the CPU to the distance calculation circuit 43, which thus calculates the distance X to the object 5 by the use of the relation that $$X = L'.F/\Delta L = L.F/\Delta L$$

on the basis of the movement distance ΔL of the lens 2 obtained through the information regarding the movement distance ΔF of the CCD arrays 3 and 4 which is input from the motor dirve circuit 32.

The value of the calculated distance X is input to CPU 42 and is stored in the memory 44 as a distance corresponding to the portion 1 included in the output signal of the AND circuit 41. In FIGS. 8(f) and (h), two portions 1 are shown correspondingly to the edge portions E, but the other portion than the portions exactly corresponding to the edge portions can be eliminated by suitable processing.

Figure 9:
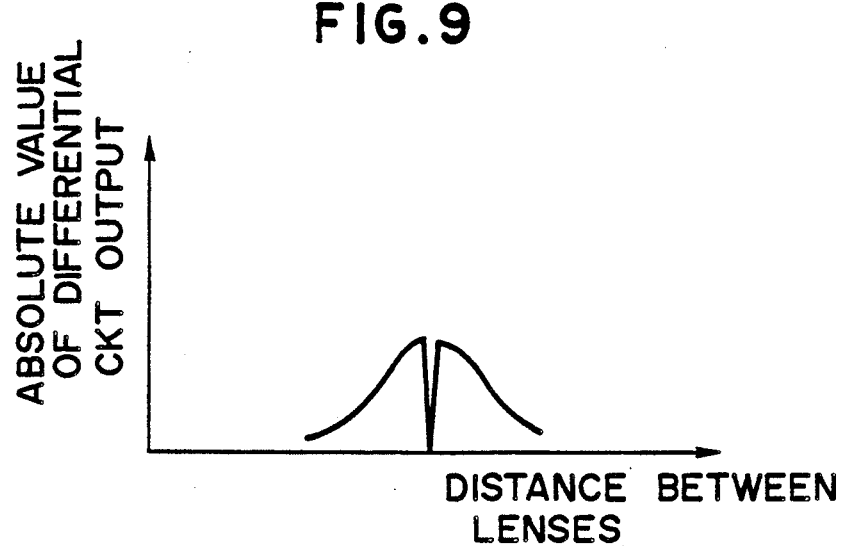
FIG. 9 illustrates the manner of the signal variation resulting from a variation in the spacing between lenses when measurement is effected by the use of the apparatus shown in FIGS. 3, 4A and 4B.

FIG. 9 schematically shows a variation in the absolute value of the output signal of the differential circuit 35 relative to the variation in the distance between the lenses 1 and 2 when in the present embodiment as described above, attention is paid to the edge portions E of the image shown in FIG. 8.

In the present embodiment, as shown in FIG. 9, the inter-lens distance for which the output of the differential circuit 35 abruptly becomes 0 is detected while the inter-lens distance is varied and therefore, detection of the in-focus state is easy and the detection accuracy is sufficiently high.

In the above-described embodiment, there has been shown an example in which the edge portions of the object are equal in distance and lie at two locations, but generally, in the ambient environment, there are many such object edge portions at various distances and therefore, by moving the lenses and the CCD arrays from the state as shown in FIG. 5A wherein the lenses are focused to infinity via the state as shown in FIG. 5B to the state in which the lenses are focused to a close distance, distance measurement is executed for each edge portion and the distance distribution to objects existing in various directions forwardly of the measuring apparatus is measured.

That is, for example, the direction of each object existing forwardly of the apparatus is determined with the CCD array 3 constituting the standard view field as the reference. The position on the CCD array of the object image formed on the CCD array depends on the direction in which the object exists and therefore, the direction of the object is discriminated on the basis of the position of each object image.

Also, by the use of the above-described method, the images MAP of the positions of objects at respective distances are formed and these images MAP are superposed one upon another to form an image, whereby the environmental recognition of the view field forward of the apparatus can be accomplished. That is, the distance distribution of objects existing in multiple directions can be obtained.

In the above-described embodiment, the point of time at which image signals are successively read out and output, that is, the pitch of the variation in the inter-lens distance when the image signals are successively read out, can be suitably set in confomity with the desired specification to improve the measurement accuracy. Further, the first threshold value in the comparing circuit 40 and the second threshold value in the comparing circuit 39 can be suitably set in conformity with the desired specification, for example, the first threshold value can be set to a relatively great value and the second threshold value can be set to a relatively small value nearly appoximate to 0.

In the above-described embodiment, the output of the differential circuit 35 is digitalized by the A/D converter 36, whereas the digitatization of the signal is not restricted to this stage, but for example, the outputs of the CCD arrays 3 and 4 may be digitalized immediately or digitatized at some other suitable stage.

In the above-described embodiment, the lens 2 and the CCD arrays 3 and 4 are moved while being maintained in a predetermined relation by a convergence adjusting mechanism as shown in FIGS. 4A and 4B, but it is also possible to drive the lens and CCD arrays independently by drive means such as a pulse motor and accomplish the maintenance of the predetermined relation during this movement by a control signal from CPU 42.

In the above-described embodiment, the case where the illumination distribution measuring means are CCD arrays is shown by way of example, whereas in the present invention, the illumination distribution measuring means may be other means, and particularly may be two-dimensional image sensors. In the case of two-demensional sensors, the direction of the main scanning line may be the direction of the base line and such processing as shown in the above-described embodiment may be executed for each line, whereby the distance distribution with regard to a predetermined range of view field may be measured.

Also, the movement of the lens 2 in the above-described embodiment can be accomplished by rectilinearly reciprocating (the barrel 1 or the support member 18) or rotating (the crank lever 16) one of the barrel 12, the crank lever 16 and the support member 18 in a predetermined direction by suitable drive means.

According to the present invention as described above, the fact of being in the in-focus state is detected on the basis of the differentiated signal of the illumination distribution measured by the illumination distribution measuring means and thereafter, the distance to the in-focus state portion is calculated on the basis of an arrangement such as an optical system and therefore, erroneous measurement based on false correspondence which may occur in the correlation method can be prevented and the measurement accuracy is greatly improved. Also, according to the present invention, the number of resolutions of the direction of distance measurement can be enhanced to the degree of the light-receiving element of the illumination distribution measuring means. Further, according to the present invention, the calculation process is simple as compared with the correlation method.

Figure 10:
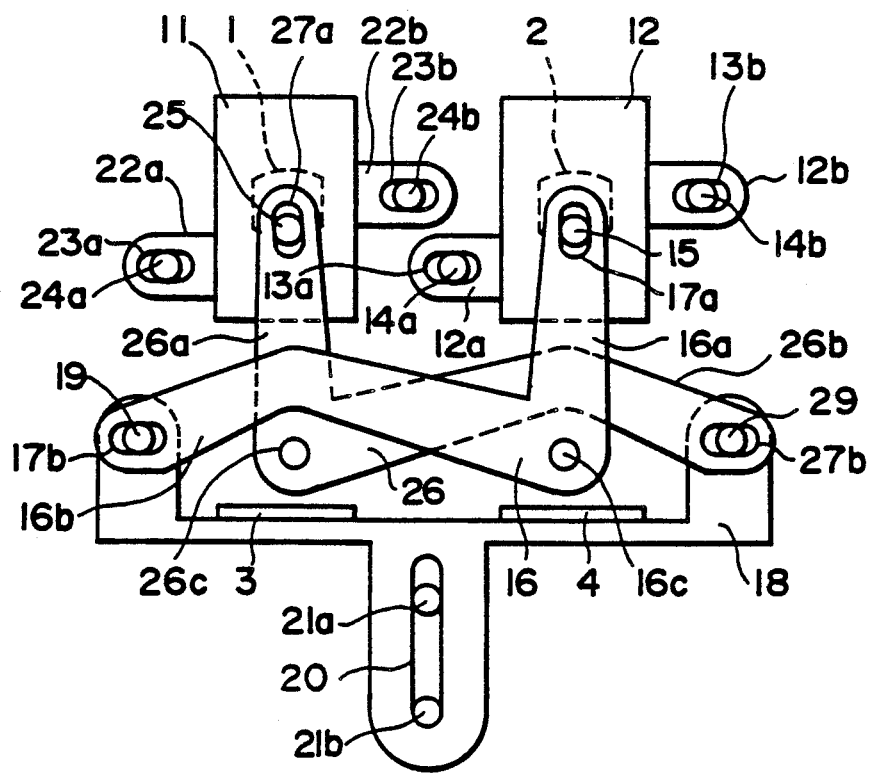
FIG. 10 schematically shows the construction of an embodiment of a convergence adjusting mechanism used in an apparatus for carrying out the distance distribution measuring method of the present invention.

FIG. 10 is a schematic view showing a second embodiment of the convergence adjusting mechanism used in the present invention. In FIG. 10, members similar to those in FIGS. 4A and 4B are given similar reference numerals.

In the present embodiment, the barrel 11 of the lens 1 is also movable in the direction of the base line, like the barrel 12 of the lens 2, but in the opposite direction. That is, in connection with the movement of the barrel 11, there are provided accessory members 22a and 22b similar to the accessory members 12a and 12b, guide slots 23a and 23b similar to the guide slots 13a and 13b, guide pins 24a and 24b similar to the guide pins 14a and 14b, a guide pin 25 similar to the guide pin 15, a crank lever 26 similar to the crank lever 16, arms 26a and 26b similar to the arms 16a and 16b, a pivot shaft 26c similar to the pivot shaft 16c, guide slots 27a and 27b similar to the guide slots 17a and 17b, and a guide pin 29 similar to the guide pin 19.

However, in the present embodiment, the ratio of the lengths of the two arms of each crank lever 16, 26 differs from the case of the first embodiment. That is, when the arm 16a of the crank lever 16 is in the direction of the optic axis, the distance from the center of the pivot shaft 16c of the crank lever 16 to the center of the guide pin 15 attached to the barrel 12 is A.L/2 and the distance from the center of the pivot shaft 16c to the center of the guide pin 19 attached to the support member 18 is A.F (where A is a proportion constant) and likewise, when the arm 26a of the crank lever 26 is in the direction of the optic axis, the distance from the center of the pivot shaft 26c of the crank lever 26 to the center of the guide pin 25 attached to the barrel 11 is A.L/2 and the distance from the center of the pivot shaft 26c to the center of the guide pin 29 attached to the support member 18 is A.F.

Thereby, the lenses 1 and 2 and the CCD arrays 3 and 4 can be relatively moved while a relation similar to that in the first embodiment is maintained.

In the above-described embodiment, guide slots are formed in the end portions of the crank lever and guide pins fitted in the guide slots are formed in the barrel and the illumination distribution measuring means support member, but in the present invention, alternatively, guide pins may be formed on the crank lever and guide slots in which the guide pins are fitted may be formed in the barrel and the support member. In such case, the barrel is formed with a guide slot extending in the direction of the optic axis and the support member is formed with a guide slot extending in the direction of the base line. Again in this case, convergence adjustment substantially similar to that in the above-described embodiment can be realized.

According to the mechanism as described above, convergence adjustment can be realized in which by a single drive source, substantially the same view field can always be imaged in the in-focus state relative to two illumination distribution measuring means, and where the present invention is applied to the distance measurement by the stereo method, the control during measurement becomes simple and the measurement accuracy can be improved.

Figure 11A:
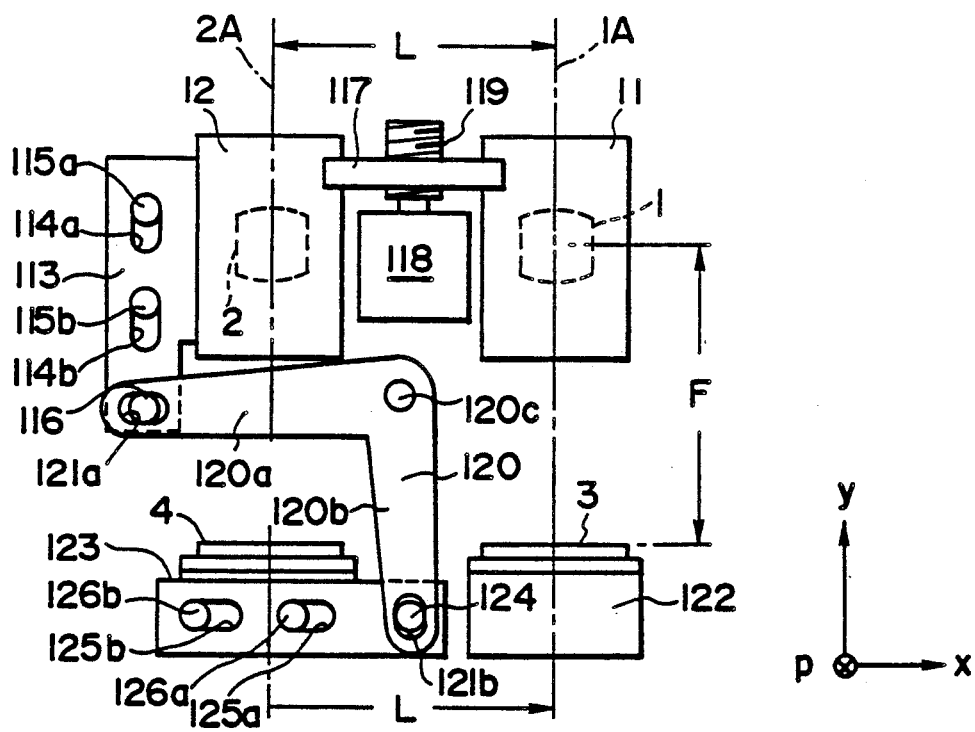
FIGS. 11A and 11B are partial schematic views showing another embodiment of the apparatus for carrying out the distance distribution measuring method of the present invention.
Figure 11B:
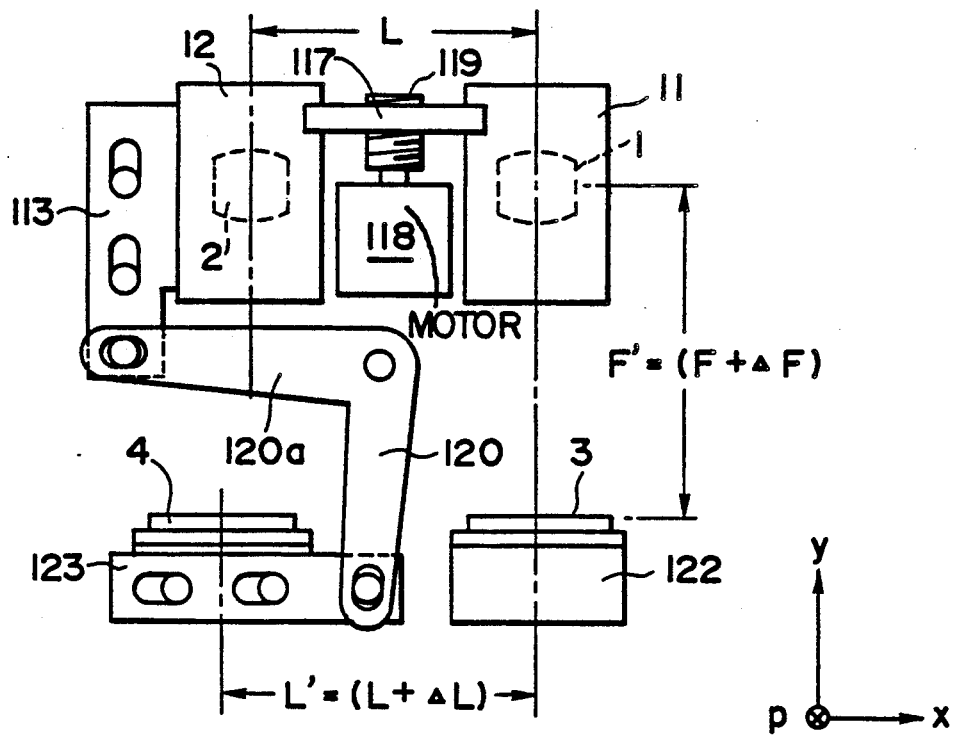

FIGS. 11A and 11B schematically show the construction of an embodiment of the convergence adjusting mechanism of the apparatus used in another embodiment of the distance distribution measuring method according to the present invention.

In FIGS. 11A and 11B, the reference numeral 11 designates the barrel of a lens 1, and the reference character 1A denotes the optic axis of the lens 1. The reference numeral 12 designates the barrel of a lens 2, and the reference character 2A denotes the optic axis of the lens 2. The optic axis 2A is parallel to the optic axis 1A of the lens 1. The barrel 12 has attached thereto an accessory member 113 extending in the direction of the optic axis 2A. The accessory member 113 is formed with guide slots 114a and 114b which extend in the direction of said optic axis. The reference characters 115a and 115b designate guide pins fixed to a frame, not shown. These guide pins are fitted in the guide slots 114a and 114b, respectively. The accessory member 113 also has attached thereto a guide pin 116 which protrudes in a direction (hereinafter referred to as the direction P) orthogonal to both of the direction of the optic axis and the direction of the base line of the two lenses 1 and 2.

The focal lengths of the lenses 1 and 2 both are F.

On the other hand, the barrels 11 and 12 are connected together by a connecting member 117. This connecting member has attached thereto drive means for reciprocally moving the connecting member and the barrels 11 and 12 in the direction of the optic axis. The drive means comprises a pulse motor 118, an externally threaded member 119 attached to the driving rotary shaft of the motor 118, and an internal thread formed on the connecting member 117 so as to mesh with the externally threaded member. The barrels 11 and 12 and the connecting member 117 are connected together.

The reference numeral 120 designates a crank lever having two arms 120a and 120b substantially orthogonal to each other. The arm 120a extends substantially in the direction of the base line, and the arm 120b extends substantially in the direction of the optic axis. A pivot shaft 120c extending in the direction P is provided in the connection between these two arms 120a and 120b. The pivot shaft 120c is rotatably connected to the frame, not shown. A guide slot 121a extending in a direction toward the center of the pivot shaft 120c is formed in the end portion of the arm 120a, while a guide slot 121b extending in the direction toward the center of the pivot shaft 120c is formed in the end portion of the arm 120b. The guide pin 116 attached to the accessory member 113 is fitted in the guide slot 121a.

The reference numerals 3 and 4 designate CCD arrays disposed correspondingly to the lenses 1 and 2, respectively, and having the same number of light-receiving elements. The CCD arrays are fixed to support members 122 and 123, respectively along the direction of the base line. One of the support members, 122, is fixed to the frame, not shown. The other support member 123 has attached thereto a guide pin 124 which protrudes in the direction P. The guide pin 124 is fitted in the guide slot 121b. Also, the support member 123 is formed with guide slots 125a and 125b extending in the direction of the base line. The reference characters 126a and 126b designate guide pins fixed to the frame, not shown. These guide pins 126a and 126b are fitted in the guide slots 125a and 125b, respectively.

In FIG. 11A, the center of the lens 1 and the center of the lens 2 lie with a distance L therebetween in the direction of the base line, and likewise, the center of the CCD array 3 and the center of the CCD array 4 lie with a distance L therebetween in the direction of the base line, and the lenses 1, 2 and the CCD arrays 3, 4 are positioned with a distance corresponding to the focal length F of the lenses 1, 2 therebetween.

FIG. 11B shows a state in which from the state of FIG. 11A, the crank lever 120 has been rotated through an angle $\theta$ clockwise about the pivot shaft 120c. By this rotation, the barrels 11 and 12 are moved upwardly as viewed in FIG. 11B by a distance $\Delta F$ in the direction of the optic axis (the y direction). On the other hand, by this rotation, the support member 23 is moved leftwardly as viewed in FIG. 11B by a distance $\Delta L$ in the direction of the base line (the x direction). In FIG. 11B, the distance between the CCD array 3 and the CCD array 4 is L' ($=L+\Delta L$), and the distance between the lenses 1, 2 and the CCD arrays 3, 4 is F' ($=F+\Delta F$).

Here, when the arm 120a of the crank lever 120 is in the direction of the base line, the distance from the center of the pivot shaft 120 of the crank lever 120 to the center of the guide pin 116 attached to the accessory member 113 is A.F and the distance from the center of the pivot shaft 120c to the center of the guide pin 124 attached to the support member 123 is A.L (where A is a proportion constant).

In this case, $$\Delta L = A.L.\tan\theta$$

$$\Delta F = A.F.\tan\theta$$

and accordingly, $$\begin{aligned} L'/F' &= (L + A \cdot L \cdot \tan\theta)/(F + A \cdot F \cdot \tan\theta) \\ &= L(1 + A \cdot \tan\theta)/F(1 + A \cdot \tan\theta) \\ &= L/F. \end{aligned}$$

Figure 12:
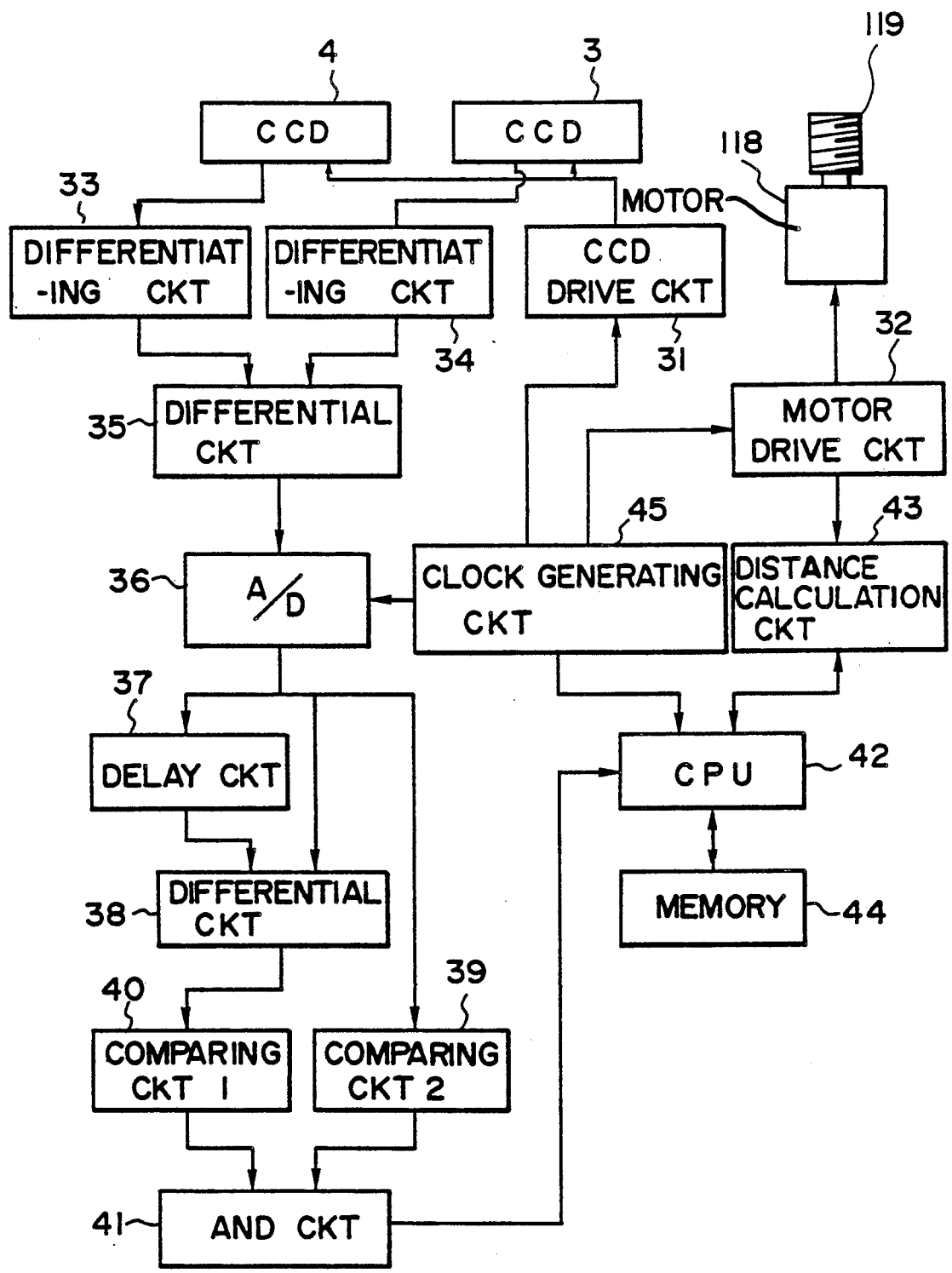
FIG. 12 is a schematic block diagram showing the processing circuit of the apparatus shown in FIGS. 11A and 11B.

FIG. 12 is a block diagram showing an embodiment of the apparatus for carrying out the distance distribution measuring method according to the present invention which uses the convergence adjusting mechanism shown in FIGS. 11A and 11B.

In FIG. 12, the CCD arrays 3 and 4 are driven for reading out at a time by a common drive circuit 31, and the pulse motor 22 is driven by a drive circuit 32.

Picture element signals from successive light-receiving elements are time-serially output from the CCD arrays 3 and 4 and are input as image information signals to differentiating circuits 33 and 34. In the differentiating circuits 33 and 34, there are obtained the differentiated signals of the image information signals. The differentiated signals mean, with respect to each picture element signal which is time-serially input, the time-serial signal of increment for the picture element signal preceding said picture element signal, and can be obtained by latching the image information signal by an amount corresponding to one picture element, and substracting the signal of this one picture element from a picture element signal which is subsequently input.

The outputs of the differentiating circuits 33 and 34 are input to a differential circuit 35, in which the difference signal of the two differentiated signals is obtained The output of the differential circuit 35 is input to an A/D converter 36, in which said difference signal is digitalized.

The output of the A/D converter 36 is input to a delay circuit 37, a differential circuit 38 and a comparing circuit 39

In the delay circuit 37, utilization is made of means for holding the image information signal of one picture plane such as BBD and delaying it in time. Accordingly, a signal which is the output of the A/D converter 36 and the output of the A/D converter preceding by one picture plane are input to the differential circuit 38 at a time. In the differential circuit 38, there are obtained the difference signal of these two signals.

The output of the differential circuit 38 is input to a comparing circuit 40. The comparing circuit 40 compares the absolute value of the input signal with a predetermined first threshold value, and outputs a signal only when the absolute value of the input signal is greater than said threshold value.

On the other hand, the comparing circuit 39 compares the absolute value of the input signal from the A/D converter 36 with a predetermined second threshold value, and outputs a signal only when the absolute value of the input signal is smaller than the second threshold value.

The output of the comparing circuit 39 and the output of the comparing circuit 40 are input to an AND circuit 41, in which there is obtained the AND signal of the two input signals.

The output of the AND circuit 41 is input to CPU 42.

On the other hand, a signal indicative of the rotation angle of the motor (which rotation angle corresponds to the position of the CCD arrays 3 or 4 in the direction of the optic axis) is output from the motor drive circuit 32 and is input to a distance calculation circuit 43.

The distance calculation circuit 43 effects distance calculation. The result of the calculation is stored in a memory 44 via CPU 42.

The reference numeral 45 designates a clock generating circuit which generates the clock of the operation of each block of the apparatus.

The operation of the apparatus of the present embodiment, that is, an embodiment of the method of the present invention, will hereinafter be described with reference to FIGS. 11A, 11B and 12 and further to FIGS. 6-8 and FIGS. 13A, 13B and 14.

Figure 13A:
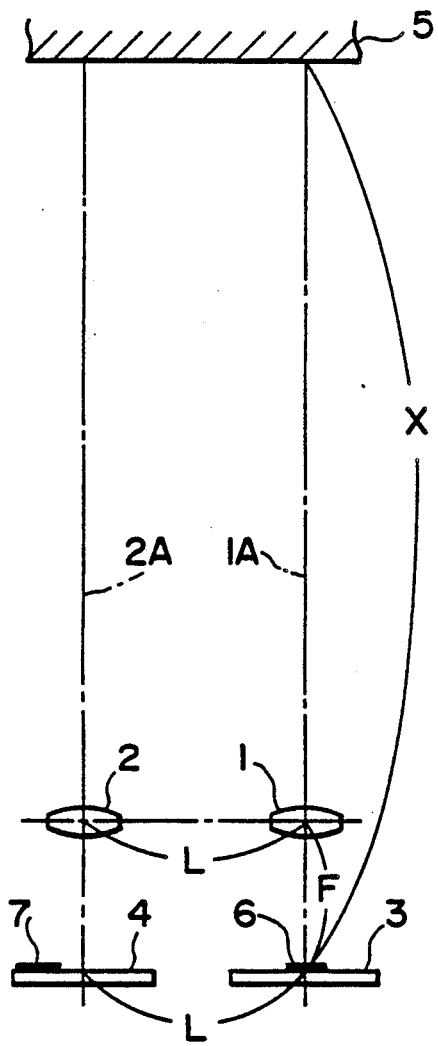
FIGS. 13A and 13B illustrate the optical systems when measurement is effected by the use of the apparatus shown in FIGS. 11A, 11B and 12.
Figure 13B:
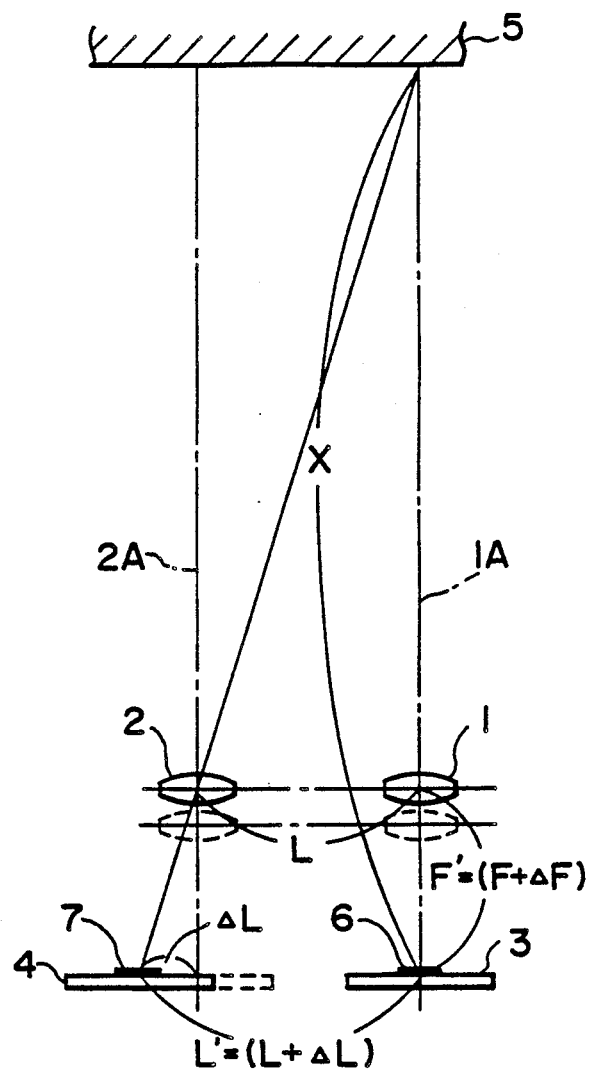

FIGS. 13A and 13B are schematic views of an optical system for explaining the details of the measurement of the present embodiment.

It is to be understood that an object 5 lies at finite distance X along the optic axes 1A and 2A and has a predetermined length in the direction of the base line.

First, let it be assumed that as shown in FIG. 13A, the distance between the CCD arrays 3 and 4 is L which is identical to the distance between the lenses and the distance between the lenses 1, 2 and the CCD arrays 3, 4 is the focal length F of the lenses. This corresponds to tee aforedescribed state of FIG. 11A.

In this state, the image on the CCD array 3 by the lens 1 is such as shown in FIG. 6(a), wherein the image of the object 5 is formed centrally in a blurred state. On the other hand, the image on the CCD array 4 by the lens 2 is such as shown in FIG. 6(b), wherein the image of the object 5 is formed at a position leftwardly deviated from the center in a blurred state. The image on the CCD array 4 is such an image that the image on the CCD array 3 has been moved leftwardly by a predetermined distance. FIGS. 6(a) and (b) correspond to the image information signals output from the CCD arrays 3 and 4, respectively.

Accordingly, the differentiated signals which are the outputs of the differentiating circuits 33 and 34 are such as shown in FIGS. 6(c) and (d), respectively. The image information signals are gentle signals because of the blur of the images on the CCD arrays and therefore, the absolute values of the differentiated signals are small.

In the differential circuit 35, there is formed a signal train indicative of the difference between the corresponding picture element signals in the outputs of the differentiating circuits 33 and 34, and this difference signal is such as shown in FIG. 6(e). This output signal is small in absolute value on the basis of the fact that the absolute values of the above-mentioned differentiated signals are small.

The output signal from the differential circuit 35 is digitalized by the A/D converter 36, and the subsequent signal processing is digitally effected.

A signal indicative of the difference between the output signal of the A/D converter 36 and the output signal of the delay circuit 37 is output from the differential circuit 38. In the initial state, there is no output of the signal preceding by one picture plane from the delay circuit 37 and therefore, in the differential circuit 38, subtraction is effected with the input signal from the A/D converter 36 used as the dummy of the input signal from the delay circuit and thus, the output signal of the differential circuit 38 generally becomes a 0 signal.

Accordingly, the input signal to the comparing circuit 40 is generally smaller in absolute value than the threshold value set in this comparing circuit and therefore, the output signal of this comparing circuit is generally 0 as shown in FIG. 6(f).

On the other hand, the input signal to the comparing circuit 39 is generally smaller in absolute value than the threshold value set in this comparing circuit and therefore, the output signal of this comparing circuit is generally 1 as shown in FIG. 6(g).

Accordingly, the output of the AND circuit 41 is generally 0 as shown in FIG. 6(h).

The output of this AND circuit 41 is input to CPU 42, and since 1 is not included in this signal, a distance calculation command is not provided from the CPU to the distance calculation circuit 43 at this point of time.

However, a motor rotation angle signal is output from the motor drive circuit 32 to the distance calculation circuit 43.

Subsequently, the pulse motor 118 is rotated through a suitable angle by the motor drive circuit 32 to thereby move the support member 18 by a predetermined distance in the direction of the optic axis and thus, the barrel 12 is moved by a predetermined distance in the direction of the base line.

The new picture plane formed in this state is subjected to signal processing in the same manner as described above. In this state, the images on the CCD arrays 3 and 4 assume a pattern substantially similar to that in the above-described case and are a little approximate to the in-focus state. However, the image on the CCD array 4 is such that the image of the object 5 is a little closer to the center than in the above-described case.

Again in the signal processing in this state, there is obtained a signal slightly differing from or identical to that described above.

Thereafter, the driving of the motor 118 and the signal processing are repeated in a similar manner.

FIG. 13B shows a state in which the distance between the CCD arrays 3 and 4 is L' and the distance between the lenses 1, 2 and the CCD arrays 3, 4 is F'. This state is realized by repeating the driving of the motor 118. This corresponds to the state of FIG. 11B.

In the present embodiment, during the rotation of the crank lever 120, $\Delta L$ and $\Delta F$ vary with the relation that $L'/F'=L/F$ being maintained as described above and thus, the images 6 and 7 of the object 5 are positioned in the in-focus state centrally of the CCD arrays 3 and 4.

That is, as described above, $L'/F'=L/F$ in FIGS. 13A and 13B and therefore, $$L/F=(L+\Delta L)/(F+\Delta F)$$

is established. Also, from the similar relation in FIG. 13B, $$L/[X-(F+\Delta F)]=(L+\Delta L)/X$$

is established. From these equations, $$1/F=1/[X-(F+\Delta F)]+1/(F+\Delta F)$$

is derived. From this, it is seen that the images 6 and 7 of the object 5 in FIG. 13B satisfy the formula of infocus imaging with respect to the lenses 1 and 2, respectively.

In the state immediately before this infocus state is reached (one picture plane before), the image on the CCD array 3 by the lens 1 is such as shown in FIG. 7(a), wherein the image of the object 5 is almost approximate to the in-focus state and formed centrally in a slightly blurred state. On the other hand, the image on the CCD array 4 by the lens 2 is such as shown in FIG. 7(b), wherein the image of the object 5 is approximate to the in-focus state and formed in a slightly blurred state at a position slightly deviated leftwardly from the center. The image on the CCD array 4 is such an image that the image on the CCD array 3 has been moved leftwardly by a slight distance. FIGS. 7(a) and (b) correspond to the image information signals output from the CCD arrays 3 and 4, respectively.

Accordingly, the differentiated signals which are the outputs of the differentiating circuits 33 and 34 are such as shown in FIGS. 7(c) and (d), respectively. The image information signals are signals in which the inclination of the edge portion is considerably steep on the basis of the fact that the images on the CCD arrays are almost in the in-focus state and therefore, in the differentiated signals, there appears a portion of relatively great absolute value in said edge portion.

Accordingly, the difference signal which is the output of the differential circuit 35 is such as shown in FIG. 7(e). In FIG. 7(e), the dotted line indicates the difference signal preceding by one picture plane, i.e., the output of the delay circuit 37.

Along with this, the output signal of the differential circuit 38 is such as shown in FIG. 7(e').

Accordingly, the input signal to the comparing circuit 40 is still smaller in absolute value than the threshold value set in this comparing circuit and therefore, the output signal of this comparing circuit is generally 0 as shown in FIG. 7(f).

On the other hand, the input signal to the comparing circuit 39 has a portion greater in absolute value than the threshold value set in this comparing circuit and therefore, the output signal of this comparing circuit is partly 1 as shown in FIG. 7(g).

Accordingly, the output of the AND circuit 41 is generally 0 as shown in FIG. 7(h).

The output of this AND circuit 41 is input to CPU 42, and since 1 is not included in this signal, a distance calculation command is not provided from the CPU to the distance calculation circuit 43 at this point of time.

Subsequently, the motor 118 is driven, whereby the in-focus state shown in FIG. 13B is brought about, but in this in-focus state, the image on the CCD array 3 by the lens 1 is such as shown in FIG. 8(a), wherein the image of the object 5 is formed centrally in a sufficient in-focus state. On the other hand, the image on the CCD array 4 by the lens 2 is such as shown in FIG. 8(b), wherein the image of the object is formed centrally in a sufficient in-focus state. The image on the CCD array 4 is an image equal to the image on the CCD array 3. FIGS. 8(a) and (b) correspond to the image information signals output from the CCD arrays 3 and 4, respectively.

Accordingly, the differentiated signals which are the outputs of the differentiating circuits 33 and 34 are such as shown in FIGS. 8(c) and (d), respectively. The image information signals are signals in which the inclination of the edge portion E is very steep on the basis of the fact that the images on the CCD arrays are in a sufficient in-focus state and therefore, in the differentiated signals, there appears a portion of sufficiently great absolute value in said edge portion E.

As described above, the images on the CCD arrays 3 and 4 are identical and the outputs from the CCD arrays 3 and 4 are identical, whereby the differentiated signals which are the outputs of the differentiating circuits 33 and 34 are also identical and therefore, the difference signal which is the output of the differential circuit 35 is generally 0 as shown in FIG. 8(e). In FIG. 8(e), the dotted line indicates the difference signal preceding by one picture plane, i.e., the output of the delay circuit 37.

Along with this, the output signal of the differential circuit 38 is such as shown in FIG. 8(e').

Accordingly, the input signal to the comparing circuit 40 includes a portion of greater absolute value than the threshold value set in this comparing circuit and therefore, the output signal of this comparing circuit is partly 1 as shown in FIG. 8(f).

On the other hand, the input signal to the comparing circuit 39 is generally smaller in absolute value than the threshold value set in this comparing circuit and therefore, the output signal of this comparing circuit is generally 1 as shown in FIG. 8(g).

Accordingly, the output of the AND circuit 41 is partly 1 as shown in FIG. 8(h).

This output of the AND circuit 41 is input to CPU 42 and 1 is included in this signal and therefore, at this point of time, a distance calculation command is provided from the CPU to the distance calculation circuit 43, which thus calculates the distance X to the object 5 by the use of the relation that $$X = L'·F/\Delta L = L·F/\Delta L$$

on the basis of the movement distance $\Delta L$ of the CCD array 4 obtained through the information regarding the movement distance $\Delta F$ of the lenses 1 and 2 which is input from the motor drive circuit 32.

The value of the calculated distance X is input to CPU 42 and is stored in the memory 44 as a distance corresponding to the portion 1 included in the output signal of the AND circuit 41. In FIGS. 8(f) and (h), two portions 1 are shown in the signal corresponding to the edge portions E, but the other portion than the portions exactly corresponding to the edge portions can be eliminated by suitable processing.

Figure 14:
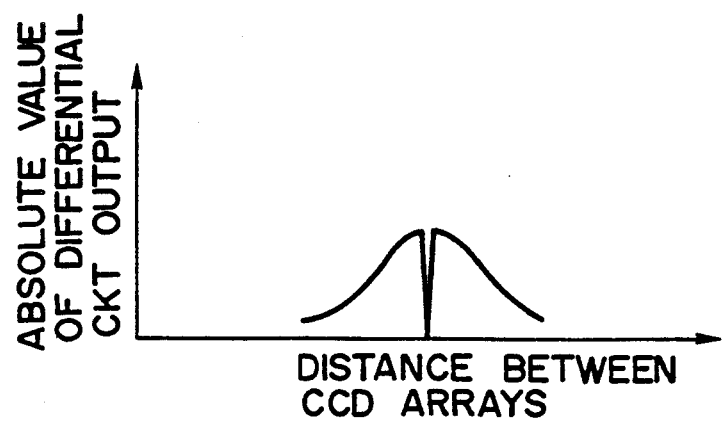
FIG. 14 illustrates the manner of the signal variation resulting from a variation in the spacing between CCD arrays when measurement is effected by the use of the apparatus shown in FIGS. 11A, 11B and 12.

FIG. 14 schematically shows a variation in the absolute value of the output signal of the differential circuit 35 relative to the variation in the distance between the CCD arrays 3 and 4 when in the present embodiment as described above, attention is paid to the edge portions E of the image shown in FIG. 8.

In the present embodiment, the distance between the CCD arrays for which the output of the differential circuit 35 abruptly becomes 0 is detected while the distance between the CCD arrays is varied and therefore, detection of the in-focus state is easy and the detection accuracy is sufficiently high.

In the above-described embodiment, there has been shown an example in which the edge portions of the object are equal in distance and lie at two locations, but generally, in the ambient environment, there are many such object edge portions at various distances and therefore, by moving the lenses and the CCD arrays from the state as shown in FIG. 13A wherein the lenses are focused to infinity via the state as shown in FIG. 13B to the state in which the lenses are focused to a close distance, distance measurement is executed for each edge portion and distance distribution is measured, as in the previously described embodiment.

In the above-described embodiment, the point of time at which the image signals are successively read out and output, that is, the inter-lens distance when the image signals are successively read out, can be suitably set in conformity with the desired specification to thereby improve the measurement accuracy. Further, the first threshold value in the comparing circuit 40 and the second threshold value in the comparing circuit 39 can be suitably set in conformity with the desired specification, for example, the first threshold value can be set to a relatively great value and the second threshold value can be set to a relatively small value nearly approximate to 0.

In each of the above-described embodiments, a pulse motor is used for the driving of the convergence adjusting mechanism, but in the present invention, other servo-motor may be used for the driving of said mechanism and a sensor for detecting the distance between two illumination distribution measuring means may be disposed separately.

In the above-described embodiments, the barrels 11 and 12 are directly driven by a drive motor and the CCD array 4 is caused to follow the movement of the barrels on the basis of the drive force, but in the present invention, the illumination distribution measuring means may be directly driven and the optical system may be caused to follow the movement thereof on the basis of the drive force.

Furthermore, in the above-described embodiments, only one of the two CCD arrays is moved, but in the present invention, the two illumination distribution measuring means may also be moved.

I claim:

1. A distance distribution measuring method for use with a first optical system, a first sensor for converting an image formed by the first optical system into a first signal, a second optical system having an optical axis substantially parallel with the optical axis of the first optical system, and a second sensor for converting an image formed by the second optical system into a second signal, the distances to a plurality of points on an object being obtained on the basis of the signals output by the first and second sensors on which are formed the images of the plurality of points, the plurality of points existing in different directions from the first and second optical systems, said method comprising the steps of:

varying the relative positions of the first sensor and the first optical system in a direction perpendicular to the optical axis of the first optical system, together with varying a length of an optical path between the first optical system and the first sensor and a length of an optical path between the second optical system and the second sensor, said varying step being performed in such a manner that the positional relationship of said first and second optical systems and said first and second sensors is varied with a predetermined trajectory in the direction of the optical axis and in the direction perpendicular to the optical axis so that the image of the points formed by said first optical system and the image of the points formed by said second optical system have a predetermined positional relationship on said first and second sensors respectively;

differentiating each of the signals output from the first and second sensors and forming a first differentiated signal and a second differentiated signal;

detecting the image of a point on the object existing in a given direction, the image being focused on each image receiving surface of the first and second sensors, on the basis of the first and second differentiated signals, said detecting step being performed by detecting when said first differentiated signal and said second differentiated signal are in a predetermined relationship corresponding to said predetermined positional relationship;

determining the distance to the point on the object when the image on each of the image receiving surfaces of the first and second sensors is in an in-focus state, which is detected by the detecting step, on the basis of the positional relationship among the first and second optical systems and the first and second sensors, wherein the distances between the first and second optical systems and said plurality of points are determined by repeatedly performing said varying operation.

2. A method according to claim 1 further comprising the step of storing the distances to a plurality of points on the object, which exist in different directions from one another, as a distance distribution.

3. A method according to claim 1, wherein the first and second optical systems have substantially the same focal length, and wherein the first and second sensors are set so that the respective image receiving surface is substantially perpendicular to the optical axis of the corresponding optical system and the spacing between the respective image receiving surface and the corresponding optical system in a direction parallel with the optical axis is substantially the same.

4. A method according to claim 3, further comprising the step of supporting the first and second optical systems with a common member, and wherein said varying step includes the step of displacing said common member in a direction parallel with the optical axes, and further comprising the step of supporting said first sensor with a supporting member which is different from a supporting member supporting the second sensor, and wherein said varying step includes the step of displacing said supporting member for the first sensor in a direction substantially perpendicular to the optical axes.

5. A method according to claim 3, further comprising the step of supporting the first optical system by a supporting member which is different from a supporting member supporting the second optical system, and wherein said varying step includes the step of displacing said supporting member for the first optical system in a direction substantially perpendicular to the optical axes, and further comprising the step of supporting the first and second sensors by a common member, and wherein said varying step includes the step of displacing said common member in a direction parallel with the optical axes.

6. A device for measuring the distribution of distances to a plurality of points on an object, the plurality of points existing in multiple directions from the device, comprising:

a first optical system;

a first sensor on which an image of a respective point on the object is formed by said first optical system, said first sensor outputting a signal corresponding to the image formed thereon;

a second optical system having an optical axis substantially parallel with an optical axis of said first optical system;

a second sensor on which an image of the respective point on the object is formed by said second optical system, said second sensor outputting a signal corresponding to the image formed thereon;

means for varying the positional relationship among the first and second optical systems and the first and second sensors to cause a length of an optical path between the first optical system and the first sensor, and a length of an optical path between the second optical system and the second sensor to be varied, and to cause the position of the first sensor to be relatively varied in a direction of perpendicular to the optical axis of the first optical system, said varying means varying the positional relationship of said first and second optical systems and said first and second sensors, respectively, in the direction of the optical axis and the direction perpendicular to the optical axis with a predetermined trajectory so that the image of said points formed by said first optical system and the image of said points formed by said second optical system have a predetermined positional relationship on said first sensor and said second sensor respectively;

differentiating means for differentiating each of the output signals from the first and second sensors and forming a first differentiated signal and a second differentiated signal;

detecting means for detecting the image of the point on the object in a given direction, focussed on the first and second sensors, on the basis of the first and second differentiated signals, said detecting means detecting whether the image of the point is in an in-focus state by detecting that the first differentiated signal and the second differentiated signal are in a predetermined relationship corresponding to said predetermined positional relationship; and measuring means for measuring the distance to the point when the images on the sensors are in the infocus state, as detected by the detecting means, on the basis of the positional relationship among the first and second optical systems and the first and second sensor, wherein said measuring means measures the distance between said device and said plurality of points by repeatedly performing the varying operation of said varying means.

7. A device according to claim 6, wherein said first and second optical systems each has a lens, both lenses having the same focal length.

8. A device according to claim 7, wherein said positional relationship varying means has a driving mechanism for varying the positional relationship among the first and second optical systems and the first and second sensors while keeping the spacing between the first optical system and the first sensor and the spacing between the second optical system and the second sensor substantially equal to each other.

9. A device according to claim 8, wherein said driving mechanism comprises:

a sensor supporting member for supporting the first and second sensors, said sensor supporting member being movable in a direction parallel with the optical axes;

a movable member coupled to said first optical system and said sensor supporting member, for displacing said first optical system in a direction perpendicular to the optical axis thereof in response to the movement of said sensor supporting member; and a driving device for displacing said sensor supporting member.

10. A device according to claim 9, further comprising a second movable member coupled to said second optical system and said sensor supporting member, for displacing said second optical system in a direction reverse to a movement direction of said first optical system in response to the displacement of the sensor supporting member.

11. A device according to claim 8, wherein said driving mechanism comprises:

an optical system supporting member for supporting said first and second optical systems, said optical system supporting member being movable in a direction parallel with the optical axes;

a sensor supporting member for supporting the first sensor;

a movable member coupled to said optical system supporting member and said sensor supporting member, for displacing said sensor supporting member in a direction perpendicular to the optical axes in response to the movement of said optical system supporting member; and a driving device for displacing said optical system supporting member.

12. A device according to claim 6, wherein said detecting means comprises:

a first differential circuit for obtaining the difference between the first differentiated signal and the second differentiated signal and outputting a first difference signal;

a first comparing circuit for comparing said first difference signal with a predetermined threshold value;

a second differential circuit for obtaining the difference between said first difference signal and a difference signal output prior to said first difference signal, and for outputting a second difference signal; and a second comparing circuit for comparing said second difference signal with a predetermined threshold value, wherein the in-focus state for the image of the object is detected on the basis of the comparing carried out in said second comparing circuit and said first comparing circuit.

13. A device according to claim 6, further comprising means for storing the distances to the object in the multiple directions, detected by said measuring means, as a distance distribution.

14. A device according to claim 6, further comprising a synchronizing control means for synchronizing the action of the positional relationship varying means with that of the measuring means.

15. A distance measuring apparatus for measuring distance to an object, comprising:

a distance measuring system having first and second optical systems, optical axes of which are parallel with each other, a first sensor for detecting a position of an image formed by said first optical system, and a second sensor for detecting a position of an image formed by said second sensor;

a driving mechanism for varying the positional relationship of said first and second optical systems and said first and second sensors with a predetermined trajectory to vary the imaging state of said first and second optical systems on said first and second sensors so that a position of the image focussed by said first optical system and a position of the image focussed by said second optical system are in a predetermined positional relationship on said first and second sensors respectively; and a signal processing system having a differential circuit for differentiating the image signals obtained by said first and second sensors, a detection circuit for detecting that a differentiated signal of said first sensor and a differentiated signal of said second sensor are in a predetermined relationship corresponding to said positional relationship, and a calculator for calculating the distance toward the object on the basis of the positional relationship of said first and second optical systems and said first and second sensors at a time when the detection by said detection circuit is performed.

16. A distance measuring method for measuring the distance to an object by using a distance measuring system having first and second optical systems the optical axes of which are substantially parallel with each other, a first sensor for detecting an image focussed by said first optical system, and a second sensor for detecting an image focussed by said second optical system, said method comprising the steps of:

changing a positional relationship of said first and second optical systems and said first and second sensors in the direction of the optical axis and in the direction perpendicular to the optical axis with a predetermined trajectory to vary the imaging state of said first and second sensors by said first and second optical systems in such a manner that the position of object image focussed by said first optical system and the position of object image focussed by said second optical system have a predetermined relationship on said first and second sensors;

a signal processing step for differentiating the imaging signals obtained by said first and second sensors, said signal processing step including a first detection for detecting that the differentiated signal of said first sensor and the differentiated signal of said second sensor are in a predetermined relationship corresponding to the positional relationship, and a second detection for determining the distance to the object on the basis of the positional relationship of said first and second optical system and said first and second sensors at a time when said first detection is performed.

* * * * *

UNITED STATES PATENT AND TRADEMARK OFFICE
CERTIFICATE OF CORRECTION

PATENT NO. : 4,989,827

DATED : Feb. 5, 1991

INVENTOR(S) : Kanehiro Sorimachi

It is certified that error appears in the above-identified patent and that said Letters Patent is hereby corrected as shown below:

[56] References Cited

U.S. PATENT DOCUMENTS

Insert --4,527,053    7/1985    Kinoshita et al.    250/201--.

FOREIGN PATENT DOCUMENTS

Insert --2 160 734    12/1985    Great Britain
         2 152 780     8/1985    Great Britain
         2 104 334     3/1983    Great Britian
         2 090 498     7/1982    Great Britian "61-112915 8/1984 Japan" should read
   --61-112915 5/1986 Japan--.

Sheet 3, Fig. 3, Logic Blocks 33 and 34,
   "Differentiat" should read --Differential--.

Sheet 10, Fig. 11B, Pivot shaft 120c should
   be noted.

Sheet 11, Fig. 12, Logic Blocks 33 and 34,
   "Differentiat" should read --Differential--.

UNITED STATES PATENT AND TRADEMARK OFFICE
CERTIFICATE OF CORRECTION

PATENT NO. : 4,989,827

DATED : Feb. 5, 1991

INVENTOR(S) : Kanehiro Sorimachi

It is certified that error appears in the above-identified patent and that said Letters Patent is hereby corrected as shown below:

Column 1

Line 35, "referece" should read --reference--.
    Line 41, "pass" should read --passes--.
    Line 55, "exist" should read --exists--.
    Line 65, "apart" should read --from the lens--.

Column 2

Line 23, "Nos." should read --No.--.
    Line 44, "to" should read --to as--.
    Line 65, "S(1)S(n)" should read --S(1)-S(n)--.

Column 6

Line 25, "(L," should read --L'=(L-$\Delta$L),--.

Column 7

Line 2, "element" should read --elements--.

Column 8

Line 41, "should" should read --shold--.

UNITED STATES PATENT AND TRADEMARK OFFICE
CERTIFICATE OF CORRECTION

PATENT NO. : 4,989,827

DATED : Feb. 5, 1991

INVENTOR(S) : Kanehiro Sorimachi

It is certified that error appears in the above-identified patent and that said Letters Patent is hereby corrected as shown below:

Column 9

Line 50, "and 4," should read --3 and 4,--.

Column 11

Line 4, "dirve" should read --drive--.
    Line 66, "appoximate" should read --approximate--.

Column 12

Line 20, "demensional" should read --dimensional--.

Column 13

Line 66, "of" (first occurrence) should be deleted.

Column 14

Line 61, "L'(=L+$\Delta$L)," should read --L'=(L+$\Delta$L),--.
    Line 62, "F'(=F+$\Delta$F)." should read --F'=(F+$\Delta$F).
    Line 65, "shaft 120" should read --shaft 120c--.

UNITED STATES PATENT AND TRADEMARK OFFICE
CERTIFICATE OF CORRECTION

PATENT NO. : 4,989,827

DATED : Feb. 5, 1991

INVENTOR(S) : Kanehiro Sorimachi

It is certified that error appears in the above-identified patent and that said Letters Patent is hereby corrected as shown below:

Column 15

Line 39, "obtained" should read --obtained.--.
    Line 45, "circuit 39" should read --circuit 39.--.
    Line 52, "are" should read --is--.

Column 18

Line 3, "infocus" should read --in-focus--.

Column 22

Line 42, "infocus" should read --in-focus--.
    Line 45, "sensor," should read --sensors,--.

Column 24

Line 4, "sensor;" should read --optical system;--.
    Line 47, "sors;" should read --sors; and--.
    Line 58 "system" should read --systems--.

Signed and Sealed this

Sixteenth Day of February, 1993

*Attest:*

STEPHEN G. KUNIN

*Attesting Officer*      *Acting Commissioner of Patents and Trademarks*